(12) United States Patent
Yoo et al.

(10) Patent No.: US 8,803,873 B2
(45) Date of Patent: Aug. 12, 2014

(54) IMAGE DISPLAY APPARATUS AND IMAGE DISPLAY METHOD THEREOF

(75) Inventors: Kyung Hee Yoo, Seoul (KR); Sang Jun Koo, Seoul (KR); Sae Hun Jang, Seoul (KR); Uni Young Kim, Seoul (KR); Hyung Nam Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 624 days.

(21) Appl. No.: 12/905,632

(22) Filed: Oct. 15, 2010

(65) Prior Publication Data

US 2011/0109619 A1   May 12, 2011

(30) Foreign Application Priority Data

Nov. 12, 2009   (KR) .................. 10-2009-0109290

(51) Int. Cl.
| | |
|---|---|
| G09G 5/00 | (2006.01) |
| G06F 3/033 | (2013.01) |
| G06T 15/00 | (2011.01) |
| H04N 13/00 | (2006.01) |
| H04N 13/04 | (2006.01) |
| H04N 9/47 | (2006.01) |
| G06K 9/00 | (2006.01) |
| G06F 3/14 | (2006.01) |
| G06F 3/00 | (2006.01) |
| G06F 3/048 | (2013.01) |
| G06F 3/0481 | (2013.01) |
| G06F 3/01 | (2006.01) |
| G06F 3/042 | (2006.01) |
| G06T 15/20 | (2011.01) |

(52) U.S. Cl.
CPC ............ *G06F 3/04815* (2013.01); *G06F 3/012* (2013.01); *G06F 3/013* (2013.01); *G06F 3/0425* (2013.01); *H04N 13/0434* (2013.01); *H04N 13/0404* (2013.01); *H04N 13/0477* (2013.01); *H04N 13/044* (2013.01); *H04N 13/0479* (2013.01); *H04N 13/0484* (2013.01); *H04N 13/0475* (2013.01); *H04N 13/0481* (2013.01); *H04N 13/0456* (2013.01); *G06T 15/20* (2013.01); *G06T 2207/10012* (2013.01)
USPC .......... 345/419; 345/156; 345/158; 345/633; 345/672; 345/649; 345/632; 345/659; 348/51; 348/42; 348/78; 382/154; 715/863; 715/848; 715/764; 715/781; 715/757; 715/782; 715/849

(58) Field of Classification Search
CPC ..... G06F 3/04815; G06F 3/012; G06F 3/013; G06F 3/0425; G02B 27/2214; G02B 27/26; G02B 27/0093; G02B 27/225; G02B 27/2228; G02B 2027/0136; H04N 13/0434; H04N 13/0409; H04N 13/0404; H04N 13/0477; H04N 13/044; H04N 13/0479; H04N 13/0484; H04N 13/0475; H04N 13/0481; H04N 13/0456; H04N 2213/008; H04N 7/144; H04N 13/004; H04N 13/0402; H04N 13/0406; G06T 15/20; G06T 2207/10012
USPC ............ 345/419, 156, 158, 8, 633, 672, 649, 345/632, 659; 348/51, E13.03, E13.038, 348/E13.022, E13.029, 42, E13.044, 348/E5.055, E13.05, E13.043, E13.041, 348/E13.042, E13.052, E13.067, E13.049, 348/E13.051, E7.08, E13.001, 14.16, 78, 348/E13.064; 382/154; 715/863, 848, 764, 715/781, 757, 782, 849
See application file for complete search history.

(56) References Cited

U.S. PATENT DOCUMENTS

| | | | |
|---|---|---|---|
| 5,781,229 A * | 7/1998 | Zediker et al. .................. 348/51 |
| 6,621,509 B1 | 9/2003 | Eiref et al. | |
| 7,002,623 B1 | 2/2006 | Ohyama et al. | |
| 8,300,043 B2 * | 10/2012 | Sundstrom et al. ........... 345/419 |
| 2005/0046645 A1 * | 3/2005 | Breton et al. ................. 345/660 |
| 2006/0125917 A1 * | 6/2006 | Cha et al. ........................ 348/51 |
| 2007/0176914 A1 * | 8/2007 | Bae et al. ...................... 345/204 |

| | | | |
|---|---|---|---|
| 2008/0030428 A1 | 2/2008 | Tomisawa et al. | |
| 2008/0231926 A1 | 9/2008 | Klug et al. | |
| 2008/0303913 A1 | 12/2008 | Mertens | |
| 2010/0007582 A1* | 1/2010 | Zalewski | 345/8 |
| 2010/0060983 A1* | 3/2010 | Wu et al. | 359/466 |
| 2010/0091091 A1* | 4/2010 | Kim | 348/42 |
| 2010/0103318 A1* | 4/2010 | Wang et al. | 348/565 |
| 2010/0171697 A1* | 7/2010 | Son et al. | 345/158 |
| 2010/0201790 A1* | 8/2010 | Son et al. | 348/53 |
| 2010/0225735 A1* | 9/2010 | Shaffer et al. | 348/14.08 |

FOREIGN PATENT DOCUMENTS

| | | |
|---|---|---|
| JP | 10-115801 A | 5/1998 |
| JP | 2001-094900 A | 4/2001 |
| JP | 2009-087026 A | 4/2009 |
| KR | 10-2006-0081498 A | 7/2006 |
| WO | WO 01/52528 A1 | 7/2001 |
| WO | WO 03/010653 A1 | 2/2003 |
| WO | WO 2008/132724 A1 | 11/2008 |

OTHER PUBLICATIONS

Yun et al., "A Structure For 2D/3D Mixed Service Based on Terrestrial DMB System", 3DTV Conference, 2007, IEEE, Pl., May 1, 207, pp. 1-4.

* cited by examiner

*Primary Examiner* — Jeffrey Chow

(74) *Attorney, Agent, or Firm* — Birch, Stewart, Kolasch & Birch, LLP

(57) ABSTRACT

An image display apparatus and an image display method where the image display apparatus according to an embodiment displays a main screen and a sub-screen having a different depth or slope from the main screen so as to create the illusion of depth and distance.

20 Claims, 18 Drawing Sheets

170

(a)

170

(b)

(a)

(b)

(c)

(d)

(e)

(a)

(b)

(c)

US 8,803,873 B2

IMAGE DISPLAY APPARATUS AND IMAGE DISPLAY METHOD THEREOF

CROSS-REFERENCE TO RELATED APPLICATION

This application claims the priority benefit of Korean Patent Application No. 10-2009-0109290, filed on Nov. 12, 2009 in the Korean Intellectual Property Office, the disclosure of which is incorporated herein by reference.

BACKGROUND OF THE INVENTION

1. Field of the Invention

The present invention relates to an image display apparatus and an image display method thereof, and more particularly, to an image display apparatus capable of displaying a stereoscopic image and an image display method of the image display apparatus.

2. Description of the Related Art

Image display apparatuses display various video data viewable to users. In addition, image display apparatuses allow users to select some video broadcast signals from plural video broadcast signals transmitted by a broadcasting station, and then display the selected video broadcast signals. The broadcasting industry is in the process of converting from analog to digital broadcasting worldwide.

Digital broadcasting is characterized by transmitting digital video and audio signals. Digital broadcasting can offer various advantages over analog broadcasting such as robustness against noise, no or little data loss, the ease of error correction and the provision of high-resolution, high-definition screens. The commencement of digital broadcasting has enabled the provision of various interactive services.

In the meantime, research has been conducted on stereoscopic images. As a result, stereoscopy is nowadays being applied to various industrial fields including the field of digital broadcasting. For this, the development of techniques for effectively transmitting stereoscopic images for digital broadcasting purposes and devices capable of reproducing such stereoscopic images is now under way.

SUMMARY OF THE INVENTION

The present invention provides an image display apparatus and an image display method thereof, that can provide a variety of information to a user using stereoscopic images.

The present invention also provides an image display apparatus and an image display method thereof, that can provide either simultaneously or in real time a variety of information regarding a content currently being used by a user.

According to an aspect of the present invention, there is provided an image display method of an image display apparatus, the image display method including displaying a first screen; generating an image signal corresponding to a second screen; processing the image signal so as for the second screen to differ from the first screen in terms of at least one of depth and slope; and displaying the second screen based on the processed image signal.

According to another aspect of the present invention, there is provided an image display apparatus including a control unit which processes an image signal corresponding to a second screen so as for the second screen to have a different depth or slope from a first screen; and a display unit which displays the second screen based on the processed image signal.

BRIEF DESCRIPTION OF THE DRAWINGS

The above and other features and advantages of the present invention will become more apparent by describing in detail the preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown. In this disclosure, the terms 'module' and 'unit' can be used interchangeably.

Figure 1:
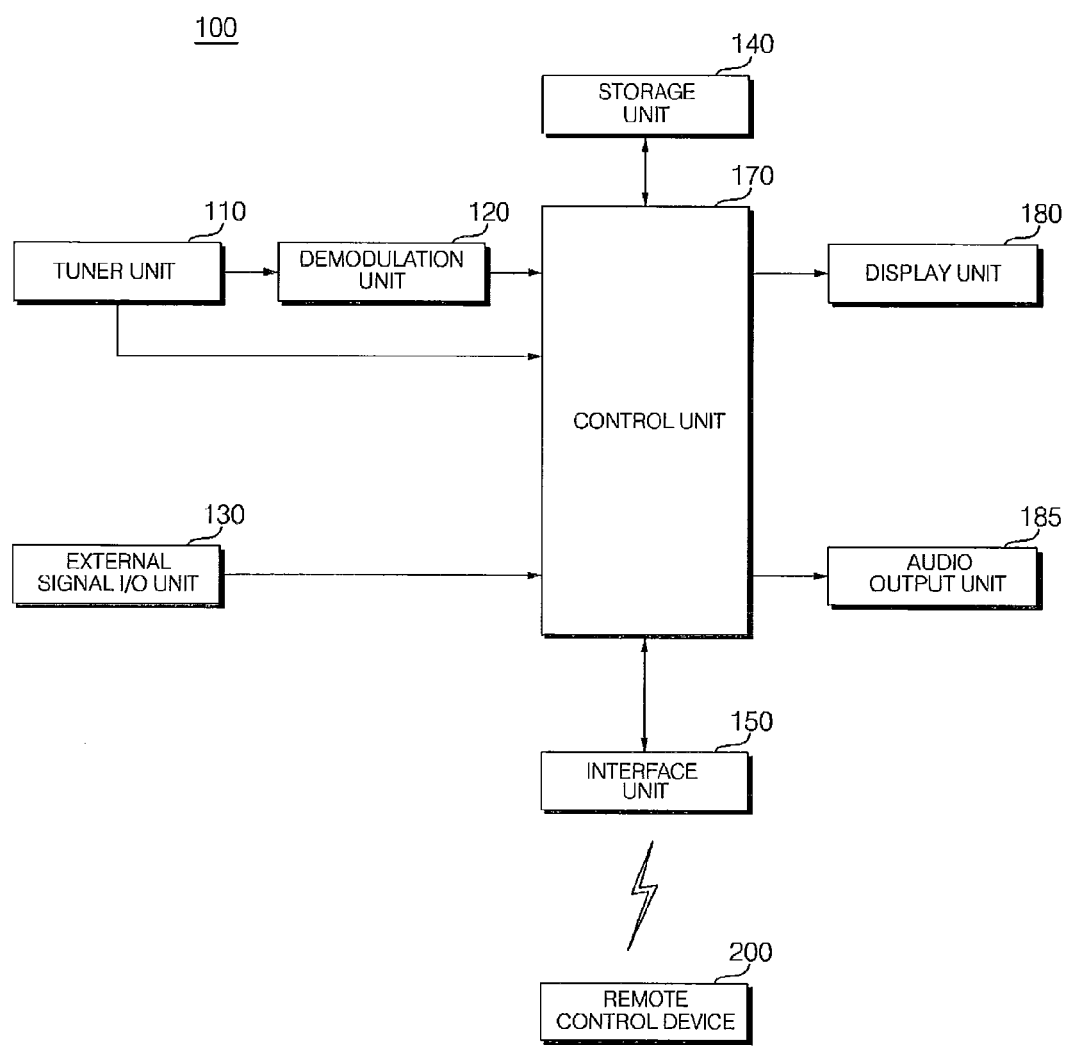
FIG. 1 illustrates a block diagram of an image display apparatus according to an exemplary embodiment of the present invention.

FIG. 1 illustrates a block diagram of an image display apparatus 100 according to an exemplary embodiment of the present invention. Referring to FIG. 1, the image display apparatus 100 may include a tuner unit 110, a demodulation unit 120, an external signal input/output (I/O) unit 130, a storage unit 140, an interface 150, a sensing unit (not shown), a control unit 170, a display unit 180, and an audio output unit 185.

The tuner unit 110 may select a radio frequency (RF) broadcast signal corresponding to a channel selected by a user or an RF broadcast signal corresponding to a previously-stored channel from a plurality of RF broadcast signals received via an antenna and may convert the selected RF broadcast signal into an intermediate-frequency (IF) signal or a baseband audio/video (A/V) signal. More specifically, if the selected RF broadcast signal is a digital broadcast signal, the tuner unit 110 may convert the selected RF broadcast signal into a digital IF signal DIF. On the other hand, if the selected RF broadcast signal is an analog broadcast signal, the tuner unit 110 may convert the selected RF broadcast signal into an analog baseband A/V signal CVBS/SIF. That is, the tuner unit 110 can process both digital broadcast signals and analog broadcast signals. The analog baseband A/V signal CVBS/SIF may be directly transmitted to the control unit 170.

The tuner unit 110 may be able to receive RF broadcast signals from an Advanced Television Systems Committee (ATSC) single-carrier system or from a Digital Video Broadcasting (DVB) multi-carrier system.

The tuner unit 110 may sequentially select a number of RF broadcast signals respectively corresponding to a number of channels previously added to the image display apparatus 100 by a channel-add function from a plurality of RF signals received through the antenna, and may convert the selected RF broadcast signals into IF signals or baseband AIV signals in order to display a thumbnail list including a plurality of thumbnail images on the display unit 180. Thus, the tuner unit 110 can receive RF broadcast signals sequentially or periodically not only from the selected channel but also from a previously-stored channel.

The demodulation unit 120 may receive the digital IF signal (DIF) from the tuner unit 110 and may demodulate the digital IF signal DIF.

More specifically, if the digital IF signal (DIF) is, for example, an ATSC signal, the demodulation unit 120 may perform 8-Vestigal SideBand (VSB) demodulation on the digital IF signal DIF. The demodulation unit 120 may perform channel decoding. For this, the demodulation unit 120 may include a Trellis decoder (not shown), a de-interleaver (not shown) and a Reed-Solomon decoder (not shown) and may thus be able to perform Trellis decoding, de-interleaving and Reed-Solomon decoding.

On the other hand, if the digital IF signal (DIF) is, for example, a DVB signal, the demodulation unit 120 may perform coded orthogonal frequency division modulation (COFDMA) demodulation on the digital IF signal DIF. The demodulation unit 120 may perform channel decoding. For this, the demodulation unit 120 may include a convolution decoder (not shown), a de-interleaver (not shown), and a Reed-Solomon decoder (not shown) and may thus be able to perform convolution decoding, de-interleaving and Reed-Solomon decoding.

The demodulation unit 120 may perform demodulation and channel decoding on the digital IF signal DIF, thereby providing a stream signal TS into which a video signal, an audio signal and/or a data signal are multiplexed. The stream signal TS may be an MPEG-2 transport stream into which an MPEG-2 video signal and a Dolby AC-3 audio signal are multiplexed. An MPEG-2 transport stream may include a 4-byte header and a 184-byte payload.

The demodulation unit 120 may include an ATSC demodulator for demodulating an ATSC signal and a DVB demodulator for demodulating a DVB signal.

The stream signal TS may be transmitted to the control unit 170. The control unit 170 may perform demultiplexing and signal processing on the stream signal TS, thereby outputting video data and audio data to the display unit 180 and the audio output unit 185, respectively.

The external signal I/O unit 130 may connect the image display apparatus 100 to an external device. For this, the external signal I/O unit 130 may include an A/V I/O module or a wireless communication module.

The external signal I/O unit 130 may be connected to an external device such as a digital versatile disc (DVD), a Blu-ray disc, a gaming device, a camera, a camcorder, or a computer (e.g., a laptop computer) either non-wirelessly or wirelessly. Then, the external signal I/O unit 130 may receive various video, audio and data signals from the external device and may transmit the received signals to the control unit 170. In addition, the external signal I/O unit 130 may output various video, audio and data signals processed by the control unit 170 to the external device.

In order to transmit A/V signals from an external device to the image display apparatus 100, the A/V I/O module of the external signal I/O unit 130 may include an Ethernet port, a universal serial bus (USB) port, a composite video banking sync (CVBS) port, a component port, a super-video (S-video) (analog) port, a digital visual interface (DVI) port, a high-definition multimedia interface (HDMI) port, a red-green-blue (RGB) port, and a D-sub port.

The wireless communication module of the external signal I/O unit 130 may wirelessly access the internet, i.e., may allow the image display apparatus 100 to access a wireless internet connection. For this, the wireless communication module may use various communication standards such as a wireless local area network (WLAN) (i.e., Wi-Fi), Wireless broadband (Wibro), World Interoperability for Microwave Access (Wimax), or High Speed Downlink Packet Access (HSDPA).

In addition, the wireless communication module may perform short-range wireless communication with other electronic devices. The image display apparatus 100 may be networked with other electronic devices using various communication standards such as Bluetooth, radio-frequency identification (RFID), Infrared Data Association (IrDA), Ultra Wideband (UWB), or ZigBee.

The external signal I/O unit 130 may be connected to various set-top boxes through at least one of the Ethernet port, the USB port, the CVBS port, the component port, the S-video port, the DVI port, the HDMI port, the RGB port, the D-sub port, the IEEE-1394 port, the S/PDIF port, and the liquidHD port and may thus receive data from or transmit data to the various set-top boxes. For example, when connected to an Internet Protocol Television (IPTV) set-top box, the external signal I/O unit 130 may transmit video, audio and data signals processed by the IPTV set-top box to the control unit 170 and may transmit various signals provided the control unit 170 to the IPTV set-top box. In addition, video, audio and data signals processed by the IPTV set-top box may be processed by the channel-browsing processor 170 and then the control unit 170.

The term 'IPTV', as used herein, may cover a broad range of services such as ADSL-TV, VDSL-TV, FTTH-TV, TV over DSL, Video over DSL, TV over IP (TVIP), Broadband TV (BTV), and Internet TV and full-browsing TV, which are capable of providing Internet-access services.

The external signal I/O unit 130 may be connected to a communication network so as to be provided with a video or voice call service. Examples of the communication network include a broadcast communication network (such as a local area network (LAN)), a public switched telephone network (PTSN), and a mobile communication network.

The storage unit 140 may store various programs necessary for the control unit 170 to process and control signals. The storage unit 140 may also store video, audio and/or data signals processed by the control unit 170.

The storage unit 140 may temporarily store video, audio and/or data signals received by the external signal I/O unit 130. In addition, the storage unit 140 may store information regarding a broadcast channel with the aid of a channel add function.

The storage unit 140 may include at least one of a flash memory-type storage medium, a hard disc-type storage medium, a multimedia card micro-type storage medium, a card-type memory (such as a secure digital (SD) or extreme digital (XD) memory), a random access memory (RAM), and a read-only memory (ROM) (such as an electrically erasable programmable ROM (EEPROM)). The image display apparatus 100 may play various files (such as a moving image file, a still image file, a music file or a document file) in the storage unit 140 for a user.

The storage unit 140 is illustrated in FIG. 1 as being separate from the control unit 170, but the present invention is not restricted to this. That is, the storage unit 140 may be included in the control unit 170.

The interface 150 may transmit a signal input thereto by a user to the control unit 170 or transmit a signal provided by the control unit 170 to a user. For example, the interface 150 may receive various user input signals such as a power-on/off signal, a channel-selection signal, and a channel-setting signal from a remote control device 200 or may transmit a signal provided by the control unit 170 to the remote control device 200. The sensing unit may allow a user to input various user commands to the image display apparatus 100 without the need to use the remote control device 200. The structure of the sensing unit will be described later in further detail.

The control unit 170 may demultiplex an input stream provided thereto via the tuner unit 110 and the demodulation unit 120 or via the external signal I/O unit 130 a number of signals and may process the signals obtained by the demultiplexing in order to output A/V data. The control unit 170 may control the general operation of the image display apparatus 100.

The control unit 170 may control the image display apparatus 100 in accordance with a user command input thereto via the interface unit 150 or the sensing unit or a program present in the image display apparatus 100.

The control unit 170 may include a demultiplexer (not shown), a video processor (not shown) and an audio processor (not shown). The control unit 170 may control the tuner unit 110 to tune to select an RF broadcast program corresponding to a channel selected by a user or a previously-stored channel.

The control unit 170 may include a demultiplexer (not shown), a video processor (not shown), an audio processor (not shown), and a user input processor (not shown).

The control unit 170 may demultiplex an input stream signal, e.g., an MPEG-2 TS signal, into a video signal, an audio signal and a data signal. The input stream signal may be a stream signal output by the tuner unit 110, the demodulation unit 120 or the external signal I/O unit 130. The control unit 170 may process the video signal. More specifically, the control unit 170 may decode the video signal using different codecs according to whether the video signal includes a two-dimensional (2D) image signal and a three-dimensional (3D) image signal, includes a 2D image signal only or includes a 3D image signal only. It will be described later in further detail how the control unit 170 processes a 2D image signal or a 3D image signal with reference to FIG. 3. The control unit 170 may adjust the brightness, tint and color of the video signal.

The processed video signal provided by the control unit 170 may be transmitted to the display unit 180 and may thus be displayed by the display unit 180. Then, the display unit 180 may display an image corresponding to the processed video signal provided by the control unit 170. The processed video signal provided by the control unit 170 may also be transmitted to an external output device via the external signal I/O unit 130.

The control unit 170 may process the audio signal obtained by demultiplexing the input stream signal. For example, if the audio signal is an encoded signal, the control unit 170 may decode the audio signal. More specifically, if the audio signal is an MPEG-2 encoded signal, the control unit 170 may decode the audio signal by performing MPEG-2 decoding. On the other hand, if the audio signal is an MPEG-4 Bit Sliced Arithmetic Coding (BSAC)-encoded terrestrial DMB signal, the control unit 170 may decode the audio signal by performing MPEG-4 decoding. On the other hand, if the audio signal is an MPEG-2 Advanced Audio Coding (AAC)-encoded DMB or DVB-H signal, the controller 180 may decode the audio signal by performing AAC decoding. In addition, the control unit 170 may adjust the base, treble or sound volume of the audio signal.

The processed audio signal provided by the control unit 170 may be transmitted to the audio output unit 185. The processed audio signal provided by the control unit 170 may also be transmitted to an external output device via the external signal I/O unit 130.

The control unit 170 may process the data signal obtained by demultiplexing the input stream signal. For example, if the data signal is an encoded signal such as an electronic program guide (EPG), which is a guide to scheduled broadcast TV or radio programs, the control unit 170 may decode the data signal. Examples of an EPG include ATSC-Program and System Information Protocol (PSIP) information and DVB-Service Information (SI). ATSC-PSIP information or DVB-SI information may be included in the header of a TS, i.e., a 4-byte header of an MPEG-2 TS.

The control unit 170 may perform on-screen display (OSD) processing. More specifically, the control unit 170 may generate an OSD signal for displaying various information on the display device 180 as graphic or text data based on a user input signal provided by the remote control device 200 or at least one of a processed video signal and a processed data signal. The OSD signal may be transmitted to the display unit 180 along with the processed video signal and the processed data signal.

The OSD signal may include various data such as a user-interface (UI) screen for the image display apparatus 100 and various menu screens, widgets, and icons.

Figure 3:
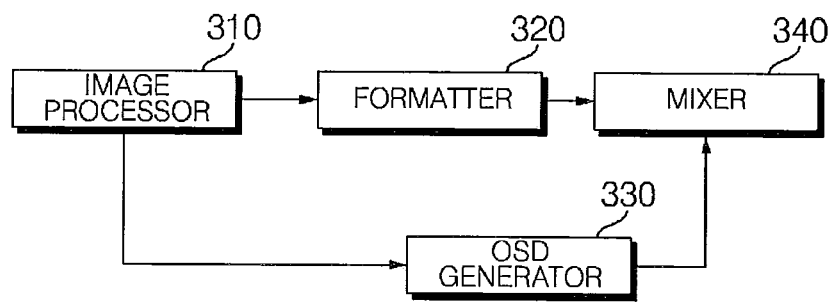
FIGS. 3(a) and 3(b) illustrate block diagrams of a control unit shown in FIG. 1.
Figure 3:
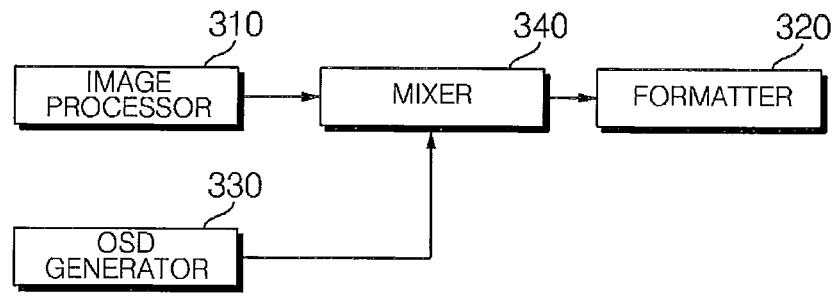

The control unit 170 may generate the OSD signal as a 2D image signal or a 3D image signal, and this will be described later in further detail with reference to FIG. 3.

The control unit 170 may receive the analog baseband A/V signal CVBS/SIF from the tuner unit 110 or the external signal I/O unit 130. An analog baseband video signal processed by the control unit 170 may be transmitted to the display unit 180, and may then be displayed by the display unit 180. On the other hand, an analog baseband audio signal processed by the control unit 170 may be transmitted to the audio output unit 185 (e.g., a speaker) and may then be output through the audio output unit 185.

The image display apparatus 100 may also include a channel-browsing processing unit (not shown) that generates a thumbnail image corresponding to a channel signal or an externally-input signal. The channel-browsing processing unit may receive the stream signal TS from the demodulation unit 120 or the external signal I/O unit 130, may extract an image from the stream signal TS, and may generate a thumbnail image based on the extracted image. The thumbnail image generated by the channel-browsing processing unit may be transmitted to the control unit 170 as it is without being encoded. Alternatively, the thumbnail image generated by the channel-browsing processing unit may be encoded, and the encoded thumbnail image may be transmitted to the control unit 170. The control unit 170 may display a thumbnail list including a number of thumbnail images input thereto on the display unit 180.

The control unit 170 may receive a signal from the remote control device 200 via the interface unit 150. Thereafter, the control unit 170 may identify a command input to the remote control device 200 by a user based on the received signal, and may control the image display apparatus 100 in accordance with the identified command. For example, if a user inputs a command to select a predetermined channel, the control unit 170 may control the tuner unit 110 to receive a video signal, an audio signal and/or a data signal from the predetermined channel, and may process the signal(s) received by the tuner unit 110. Thereafter, the control unit 170 may control channel information regarding the predetermined channel to be output through the display unit 180 or the audio output unit 185 along with the processed signal(s).

A user may input may input a command to display various types of A/V signals to the image display apparatus 100. If a user wishes to watch a camera or camcorder image signal received by the external signal I/O unit 130, instead of a broadcast signal, the control unit 170 may control a video signal or an audio signal to be output via the display unit 180 or the audio output unit 185.

The control unit 170 may identify a user command input to the image display apparatus 100 via a number of local keys, which is included in the sensing unit, and may control the image display apparatus 100 in accordance with the identified user command. For example, a user may input various commands such as a command to turn on or off the image display apparatus 100, a command to switch channels, or a command to change volume to the image display apparatus 100 using the local keys. The local keys may include buttons or keys provided at the image display apparatus 100. The control unit 170 may determine how the local keys have been manipulated by a user, and may control the image display apparatus 100 according to the results of the determination.

The display unit 180 may convert a processed video signal, a processed data signal, and an OSD signal provided by the control unit 170 or a video signal and a data signal provided by the external signal I/O unit 130 into RGB signals, thereby generating driving signals. The display unit 180 may be implemented into various types of displays such as a plasma display panel, a liquid crystal display (LCD), an organic light-emitting diode (OLED), a flexible display, and a 3D display. The display unit 180 may be classified into an additional display or an independent display. The independent display is a display device capable of displaying a 3D image without a requirement of additional display equipment such as glasses. Examples of the independent display include a lenticular display and parallax barrier display. On the other hand, the additional display is a display device capable of displaying a 3D image with the aid of additional display equipment. Examples of the additional display include a head mounted display (HMD) and an eyewear display (such as a polarized glass-type display, a shutter glass display, or a spectrum filter-type display).

The display unit 180 may also be implemented as a touch screen and may thus be used not only as an output device but also as an input device.

The audio output unit 185 may receive a processed audio signal (e.g., a stereo signal, a 3.1-channel signal or a 5.1-channel signal) from the control unit 170 and may output the received audio signal. The audio output unit 185 may be implemented into various types of speakers.

The remote control device 200 may transmit a user input to the interface 150. For this, the remote control device 200 may use various communication techniques such as Bluetooth, RF, IR, UWB and ZigBee.

The remote control device 100 may receive a video signal, an audio signal or a data signal from the interface unit 150, and may output the received signal.

The image display apparatus 100 may also include the sensor unit. The sensor unit may include a touch sensor, an acoustic sensor, a position sensor, and a motion sensor.

The touch sensor may be a touch screen of the display unit 180. The touch sensor may sense where on the touch screen and with what intensity a user is touching. The acoustic sensor may sense the voice of a user various sounds generated by a user. The position sensor may sense the position of a user. The motion sensor may sense a gesture generated by a user. The position sensor or the motion sensor may include an infrared detection sensor or camera, and may sense the distance between the image display apparatus 100 and a user, and any hand gestures made by the user.

The sensor unit may transmit various sensing results provided by the touch sensor, the acoustic sensor, the position sensor and the motion sensor to a sensing signal processing unit (not shown). Alternatively, the sensor unit may analyze the various sensing results, and may generate a sensing signal based on the results of the analysis. Thereafter, the sensor unit may provide the sensing signal to the control unit 170.

The sensing signal processing unit may process the sensing signal provided by the sensing unit, and may transmit the processed sensing signal to the control unit 170.

The image display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs or may be a mobile digital broadcast receiver capable of receiving at least one of terrestrial DMB broadcast programs, satellite DMB broadcast programs, ATSC-M/H broadcast programs, DVB-H (COFDM) broadcast programs, and Media Forward Link Only (MediaFLO) broadcast programs. Alternatively, the image display apparatus 100 may be a digital broadcast receiver capable of receiving cable broadcast programs, satellite broadcast programs or IPTV programs.

Examples of the image display apparatus 100 include a TV receiver, a mobile phone, a smart phone, a laptop computer, a digital broadcast receiver, a personal digital assistant (PDA) and a portable multimedia player (PMP).

The structure of the image display apparatus 100 shown in FIG. 1 is exemplary. The elements of the image display apparatus 100 may be incorporated into fewer modules, new elements may be added to the image display apparatus 100 or some of the elements of the image display apparatus 100 may not be provided. That is, two or more of the elements of the image display apparatus 100 may be incorporated into a single module, or some of the elements of the image display apparatus 100 may each be divided into two or more smaller units. The functions of the elements of the image display apparatus 100 are also exemplary, and thus do not put any restrictions on the scope of the present invention.

Figure 2:
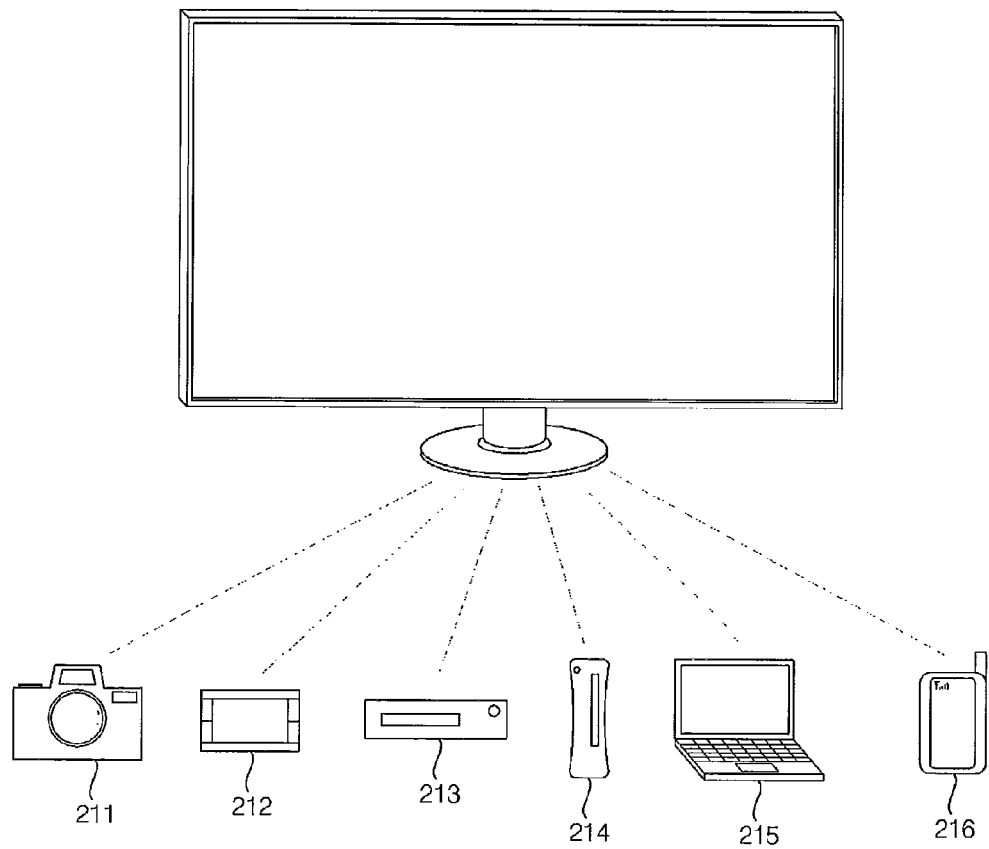
FIG. 2 illustrates various types of external devices that can be connected to the image display apparatus shown in FIG. 1.

FIG. 2 illustrates examples of an external device that can be connected to the image display apparatus 100. Referring to FIG. 3, the image display apparatus 100 may be connected either non-wirelessly or wirelessly to an external device via the external signal I/O unit 130.

Examples of the external device to which the image display apparatus 100 may be connected include a camera 211, a screen-type remote control device 212, a set-top box 213, a gaming device 214, a computer 215 and a mobile communication terminal 216.

When connected to an external device via the external signal I/O unit 130, the image display apparatus 100 may display a graphic user interface (GUI) screen provided by the external device on the display unit 180. Then, a user may access both the external device and the image display apparatus 100 and may thus be able to view video data currently being played by the external device or video data present in the external device from the image display apparatus 100. In addition, the image display apparatus 100 may output audio data currently being played by the external device or audio data present in the external device via the audio output unit 185.

Various data, for example, still image files, moving image files, music files or text files, present in an external device to which the image display apparatus 100 is connected via the external signal I/O unit 130 may be stored in the storage unit 140 of the image display apparatus 100. In this case, even after disconnected from the external device, the image display apparatus 100 can output the various data stored in the storage unit 140 via the display unit 180 or the audio output unit 185.

When connected to the mobile communication terminal 216 or a communication network via the external signal I/O unit 130, the image display apparatus 100 may display a screen for providing a video or voice call service on the display unit 180 or may output audio data associated with the provision of the video or voice call service via the audio output unit 185. Thus, a user may be allowed to make or receive a video or voice call with the image display apparatus 100, which is connected to the mobile communication terminal 216 or a communication network.

Figure 6:
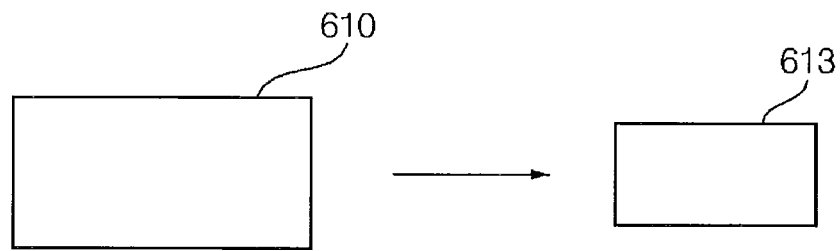
FIGS. 6(a) through 6(c) illustrate how the formatter shown in FIG. 3 scales a 3D image.
Figure 6:
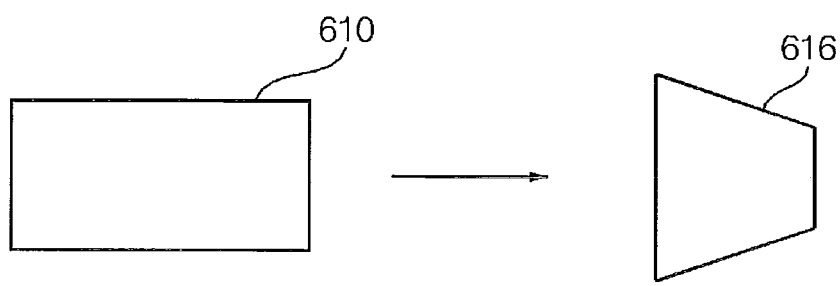
Figure 6:
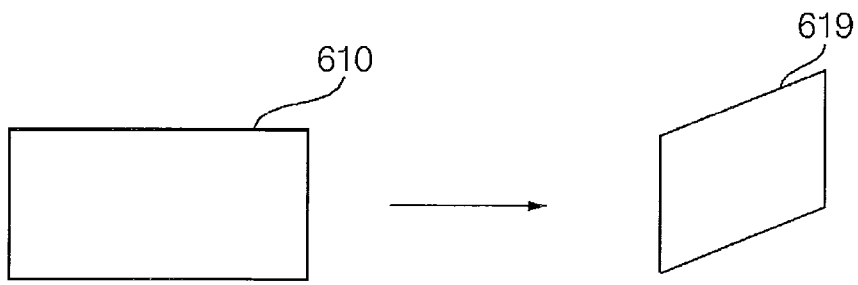

FIGS. 3(a) and 3(b) illustrate block diagrams of the control unit 170, FIGS. 4(a) through 4(g) illustrate how a formatter 320 shown in FIG. 3(a) or 3(b) separates a 2D image signal and a 3D image signal, FIGS. 5(a) through 5(e) illustrate various examples of the format of a 3D image output by the formatter 320, and FIGS. 6(a) through 6(c) illustrate how to scale a 3D image output by the formatter 320.

Referring to FIG. 3(a), the control unit 170 may include an image processor 310, the formatter 320, an on-screen display (OSD) generator 330 and a mixer 340.

Referring to FIG. 3(a), the image processor 310 may decode an input image signal, and may provide the decoded image signal to the formatter 320. Then, the formatter 320 may process the decoded image signal provided by the image processor 310 and may thus provide a plurality of perspective image signals. The mixer 340 may mix the plurality of perspective image signals provided by the formatter 320 and an image signal provided by the OSD generator 330.

More specifically, the image processor 310 may process both a broadcast signal processed by the tuner unit 110 and the demodulation unit 120 and an externally input signal provided by the external signal I/O unit 130.

The input image signal may be a signal obtained by demultiplexing a stream signal.

If the input image signal is, for example, an MPEG-2-encoded 2D image signal, the input image signal may be decoded by an MPEG-2 decoder.

On the other hand, if the input image signal is, for example, an H.264-encoded 2D DMB or DVB-H image signal, the input image signal may be decoded by an H.264 decoder.

On the other hand, if the input image signal is, for example, an MPEG-C part 3 image with disparity information and depth information, not only the input image signal but also the disparity information may be decoded by an MPEG-C decoder.

On the other hand, if the input image signal is, for example, a Multi-View Video Coding (MVC) image, the input image signal may be decoded by an MVC decoder.

On the other hand, if the input image signal is, for example, a free viewpoint TV (FTV) image, the input image signal may be decoded by an FTV decoder.

The decoded image signal provided by the image processor 310 may include a 2D image signal only, include both a 2D image signal and a 3D image signal or include a 3D image signal only.

The decoded image signal provided by the image processor 310 may be a 3D image signal with various formats. For example, the decoded image signal provided by the image processor 310 may be a 3D image including a color image and a depth image or a 3D image including a plurality of perspective image signals. The plurality of perspective image signals may include a left-eye image signal L and a right-eye image signal R. The left-eye image signal L and the right-eye image signal R may be arranged in various formats such as a side-by-side format shown in FIG. 5(a), a top-down format shown in FIG. 5(b), a frame sequential format shown in FIG. 5(c), an interlaced format shown in FIG. 5(d), or a checker box format shown in FIG. 5(e).

If the input image signal includes caption data or an image signal associated with data broadcasting, the image processor 310 may separate the caption data or the image signal associated with data broadcasting from the input image signal and may output the caption data or the image signal associated with data broadcasting to the OSD generator 330. Then, the OSD generator 330 may generate 3D objects based on the caption data or the image signal associated with data broadcasting.

The formatter 320 may receive the decoded image signal provided by the image processor 310, and may separate a 2D image signal and a 3D image signal from the received decoded image signal. The formatter 320 may divide a 3D image signal into a plurality of view signals, for example, a left-eye image signal and a right-eye image signal.

It may be determined whether the decoded image signal provided by the image processor 310 is a 2D image signal or a 3D image signal based on whether a 3D image flag, 3D image metadata, or 3D image format information is included in the header of a corresponding stream.

The 3D image flag, the 3D image metadata or the 3D image format information may include not only information regarding a 3D image but also location information, region information or size information of the 3D image. The 3D image flag, the 3D image metadata or the 3D image format information may be decoded, and the decoded 3D image flag, the decoded image metadata or the decoded 3D image format information may be transmitted to the formatter 320 during the demultiplexing of the corresponding stream.

The formatter 320 may separate a 3D image signal from the decoded image signal provided by the image processor 310 based on the 3D image flag, the 3D image metadata or the 3D image format information. The formatter 320 may divide the 3D image signal into a plurality of perspective image signals with reference to the 3D image format information. For example, the formatter 320 may divide the 3D image signal into a left-eye image signal and a right-eye image signal based on the 3D image format information.

Referring to FIGS. 4(a) through 4(g), the formatter 320 may separate a 2D image signal and a 3D image signal from the decoded image signal provided by the image processor 310 and may then divide the 3D image signal into a left-eye image signal and a right-eye image signal.

Figure 4:
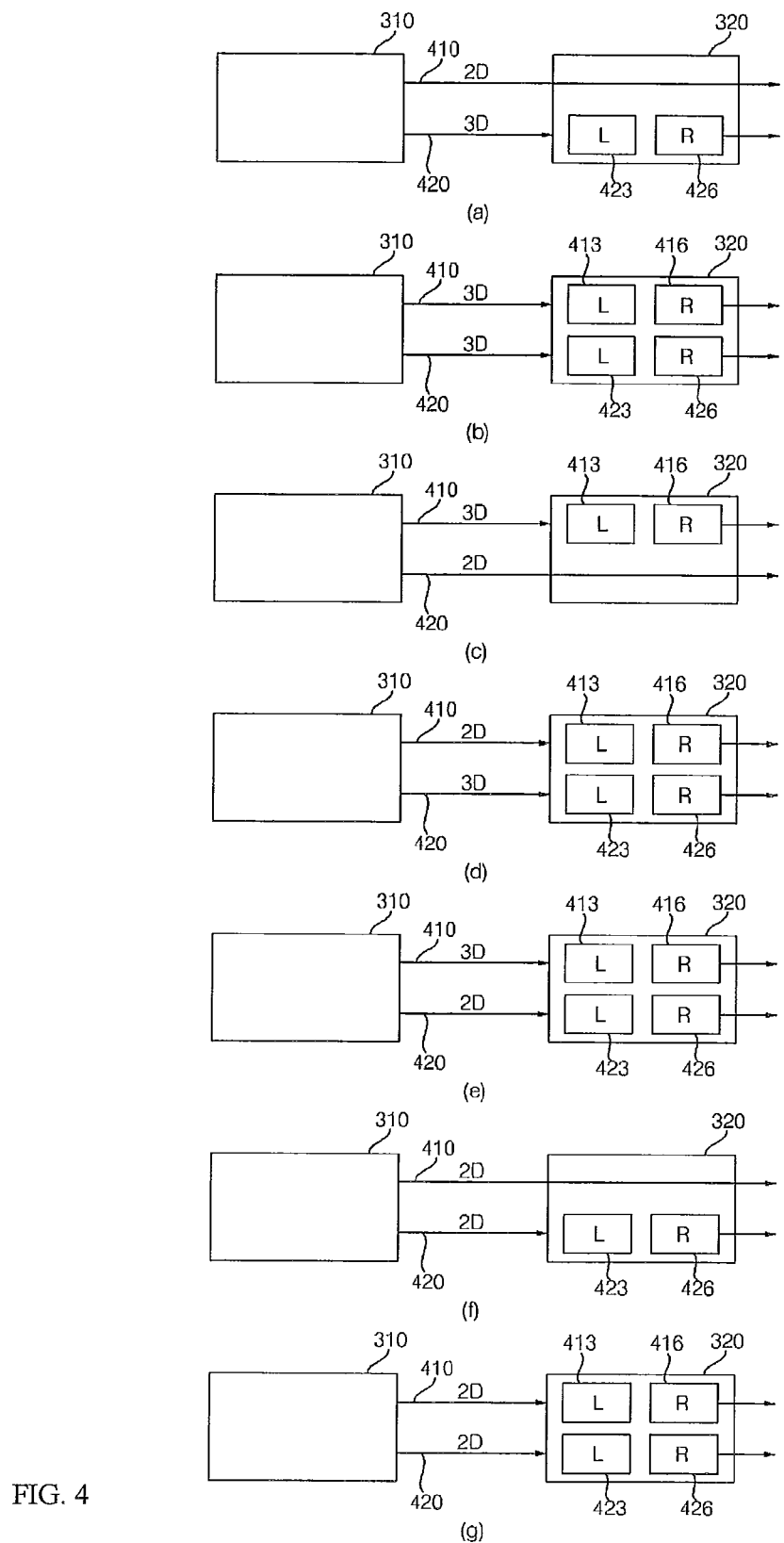
FIGS. 4(a) through 4(g) illustrate how a formatter shown in FIG. 3 separates a two-dimensional (2D) image signal and a three-dimensional (3D) image signal.
Figure 5:
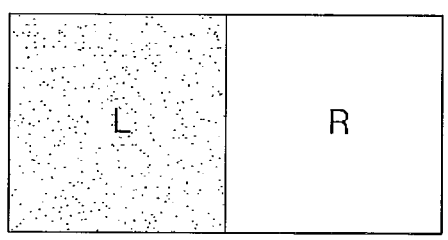
FIGS. 5(a) through 5(e) illustrate various 3D image formats provided by the formatter shown in FIG. 3.
Figure 5:
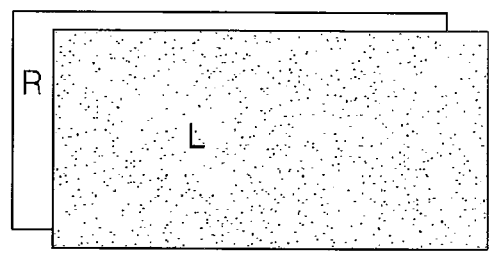
Figure 5:
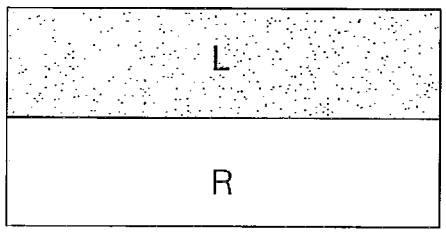
Figure 5:
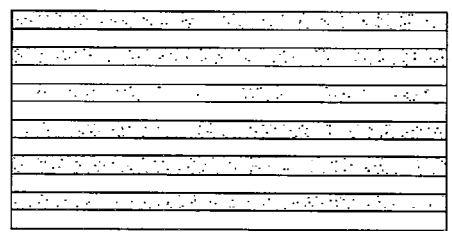
Figure 5:
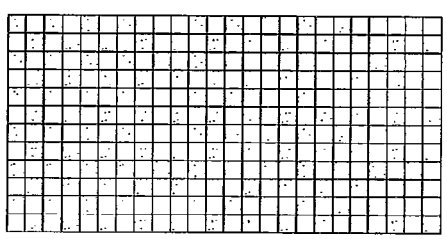

More specifically, referring to FIG. 4(a), if a first image signal 410 is a 2D image signal and a second image signal 420 is a 3D image signal, the formatter 320 may separate the first and second image signals 410 and 420 from each other, and may divide the second image signal 420 into a left-eye image signal 423 and a right-eye image signal 426. The first image signal 410 may be displayed on the display unit 180 as a main screen, and the second image signal 420 may be displayed on the display unit 180 as a picture-in-picture (PIP) screen.

Referring to FIG. 4(b), if the first and second image signals 410 and 420 are both 3D image signals, the formatter 320 may separate the first and second image signals 410 and 420 from each other, may divide the first image signal 410 into a left-eye image signal 413 and a right-eye image signal 416, and may divide the second image signal 420 into the left-eye image signal 423 and the right-eye image signal 426.

Referring to FIG. 4(c), if the first image signal 410 is a 3D image signal and the second image signal 420 is a 2D image signal, the formatter 320 may divide the first image signal into the left-eye image signal 413 and the right-eye image signal 416.

Referring to FIGS. 4(d) and 4(e), if one of the first and second image signals 410 and 420 is a 3D image signal and the other image signal is a 2D image signal, the formatter 320 may convert whichever of the first and second image signals 410 and 420 is a 2D image signal into a 3D image signal in response to, for example, user input. More specifically, the formatter 320 may convert a 2D image signal into a 3D image signal by detecting edges from the 2D image signal using a 3D image creation algorithm, extracting an object with the detected edges from the 2D image signal, and generating a 3D image signal based on the extracted object. Alternatively, the formatter 320 may convert a 2D image signal into a 3D image signal by detecting an object, if any, from the 2D image signal using a 3D image generation algorithm and generating a 3D image signal based on the detected object. Once a 2D image signal is converted into a 3D image signal, the formatter 320 may divide the 3D image signal into a left-eye image signal and a right-eye image signal. A 2D image signal except for an object to be reconstructed as a 3D image signal may be output as a 2D image signal.

Referring to FIG. 4(f), if the first and second image signals 410 and 420 are both 2D image signals, the formatter 320 may convert only one of the first and second image signals 410 and 420 into a 3D image signal using a 3D image generation algorithm. Alternatively, referring to FIG. 4G, the formatter 320 may convert both the first and second image signals 410 and 420 into 3D image signals using a 3D image generation algorithm.

If there is a 3D image flag, 3D image metadata or 3D image format information available, the formatter 320 may determine whether the decoded image signal provided by the image processor 310 is a 3D image signal with reference to the 3D image flag, the 3D image metadata or the 3D image format information. On the other hand, if there is no 3D image flag, 3D image metadata or 3D image format information available, the formatter 320 may determine whether the decoded image signal provided by the image processor 310 is a 3D image signal by using a 3D image generation algorithm.

A 3D image signal provided by the image processor 310 may be divided into a left-eye image signal and a right-eye image signal by the formatter 320. Thereafter, the left-eye image signal and the right-eye image signal may be output in one of the formats shown in FIGS. 5(a) through 5(e). A 2D image signal provided by the image processor 310, however, may be output as is without the need to be processed or may be transformed and thus output as a 3D image signal.

As described above, the formatter 320 may output a 3D image signal in various formats. More specifically, referring to FIGS. 5(a) through 5(e), the formatter 320 may output a 3D image signal in a side-by-side format, a top-down format, a frame sequential format, an interlaced format, in which a left-eye image signal and a right-eye image signal are mixed on a line-by-line basis, or a checker box format, in which a left-eye image signal and a right-eye image signal are mixed on a box-by-box basis.

A user may select one of the formats shown in FIGS. 5(a) through 5(e) as an output format for a 3D image signal. For example, if a user selects the top-down format, the formatter 320 may reconfigure a 3D image signal input thereto, divide the input 3D image signal into a left-eye image signal and a right-eye image signal, and output the left-eye image signal and the right-eye image signal in the top-down format regardless of the original format of the input 3D image signal.

A 3D image signal input to the formatter 320 may be a broadcast image signal, an externally-input signal or a 3D image signal with a predetermined depth level. The formatter 320 may divide the 3D image signal into a left-eye image signal and a right-eye image signal.

Left-eye image signals or right-eye image signals extracted from 3D image signals having different depths may differ from one another. That is, a left-eye image signal or a right-eye image signal extracted from a 3D image signal or the disparity between the extracted left-eye image signal and the extracted right-eye image signal may change according to the depth of the 3D image signal.

If the depth of a 3D image signal is changed in accordance with a user input or user settings, the formatter 320 may divide the 3D image signal into a left-eye image signal and a right-eye image signal in consideration of the changed depth.

The formatter 320 may scale a 3D image signal, and particularly, a 3D object in a 3D image signal, in various manners.

More specifically, referring to FIG. 6(a), the formatter 320 may generally enlarge or reduce a 3D image signal or a 3D object in the 3D image signal. Alternatively, referring to FIG. 6(b), the formatter 320 may partially enlarge or reduce the 3D image signal or the 3D object into a trapezoid. Alternatively, referring to FIG. 6(c), the formatter 320 may rotate the 3D image signal or the 3D object and thus transform the 3D object or the 3D object into a parallelogram. In this manner, the formatter 320 may add a sense of three-dimensionality to the 3D image signal or the 3D object and may thus emphasize a 3D effect. The 3D image signal may be a left-eye image signal or a right-eye image signal of the second image signal 420. Alternatively, the 3D image signal may be a left-eye image signal or a right-eye image signal of a PIP image.

In short, the formatter 320 may receive the decoded image signal provided by the image processor 310, may separate a 2D image signal or a 3D image signal from the received image signal, and may divide the 3D image signal into a left-eye image signal and a right-eye image signal. Thereafter, the formatter 320 may scale the left-eye image signal and the right-eye image signal and may then output the results of the scaling in one of the formats shown in FIGS. 5(a) through 5(e). Alternatively, the formatter 320 may rearrange the left-eye image signal and the right-eye image signal in one of the formats shown in FIGS. 5(a) through 5(e) and may then scale the result of the rearrangement.

Referring to FIG. 3(a), the OSD generator 330 may generate an OSD signal in response to or without user input. The OSD signal may include a 2D OSD object or a 3D OSD object.

It may be determined whether the OSD signal includes a 2D OSD object or a 3D OSD object based on user input, the size of the object or whether the OSD object of the OSD signal is an object that can be selected.

The OSD generator 330 may generate a 2D OSD object or a 3D OSD object and output the generated OSD object, whereas the formatter 320 merely processes the decoded image signal provided by the image processor 310. A 3D OSD object may be scaled in various manners, as shown in FIGS. 6(a) through 6(c). The type or shape of a 3D OSD object may vary according to the depth at which the 3D OSD is displayed.

The OSD signal may be output in one of the formats shown in FIGS. 5(a) through 5(e). More specifically, the OSD signal may be output in the same format as that of an image signal output by the formatter 320. For example, if a user selects the top-down format as an output format for the formatter 320, the top-down format may be automatically determined as an output format for the OSD generator 330.

The OSD generator 330 may receive a caption- or data broadcasting-related image signal from the image processor 310, and may output a caption- or data broadcasting-related OSD signal. The caption- or data broadcasting-related OSD signal may include a 2D OSD object or a 3D OSD object.

The mixer 340 may mix an image signal output by the formatter 320 with an OSD signal output by the OSD generator 330, and may output an image signal obtained by the mixing. The image signal output by the mixer 340 may be transmitted to the display unit 180.

The control unit 170 may have a structure shown in FIG. 3(b). Referring to FIG. 3(b), the control unit 170 may include an image processor 310, a formatter 320, an OSD generator 330 and a mixer 340. The image processor 310, the formatter 320, the OSD generator 330 and the mixer 340 are almost the same as their respective counterparts shown in FIG. 3(a), and thus will hereinafter be described, focusing mainly on differences with their respective counterparts shown in FIG. 3(a).

Referring to FIG. 3(b), the mixer 340 may mix a decoded image signal provided with the image processor 310 with an OSD signal provided by the OSD generator 330, and then, the formatter 320 may process an image signal obtained by the mixing performed by the mixer 340. Thus, the OSD generator 330 shown in FIG. 3(b), unlike the OSD generator 330 shown in FIG. 3(a), does no need to generate a 3D object. Instead, the OSD generator 330 may simply generate an OSD signal corresponding to any given 3D object.

Referring to FIG. 3(b), the formatter 320 may receive the image signal provided by the mixer 340, may separate a 3D image signal from the received image signal, and may divide the 3D image signal into a plurality of perspective image signals. For example, the formatter 320 may divide a 3D image signal into a left-eye image signal and a right-eye image signal, may scale the left-eye image signal and the right-eye image signal, and may output the scaled left-eye image signal and the scaled right-eye image signal in one of the formats shown in FIGS. 5(a) through 5(e).

The structure of the control unit 170 shown in FIG. 3(a) or 3(b) is exemplary. The elements of the control unit 170 may be incorporated into fewer modules, new elements may be added to the control unit 170 or some of the elements of the control unit 170 may not be provided. That is, two or more of the elements of the control unit 170 may be incorporated into a single module, or some of the elements of the control unit 170 may each be divided into two or more smaller units. The functions of the elements of the control unit 170 are also exemplary, and thus do not put any restrictions on the scope of the present invention.

Figure 7A:
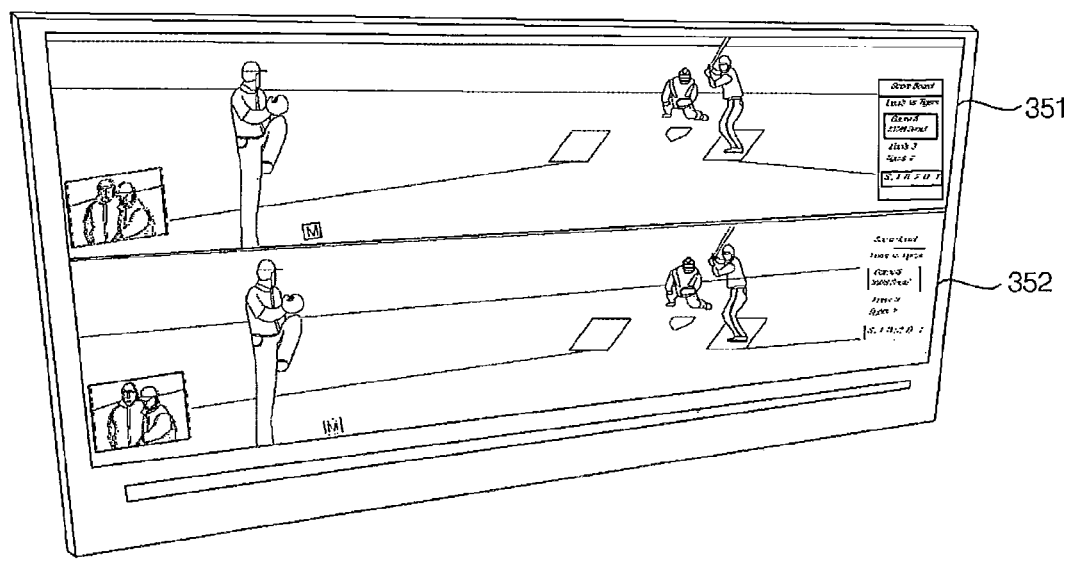
FIGS. 7A through 7C illustrate various images that can be displayed by the image display apparatus shown in FIG. 1.
Figure 7B:
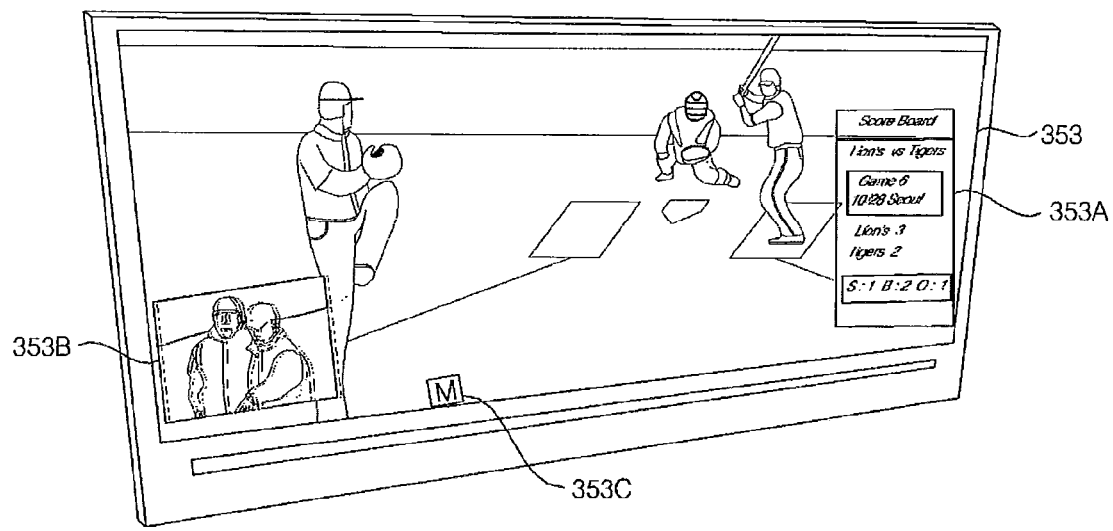
Figure 7C:
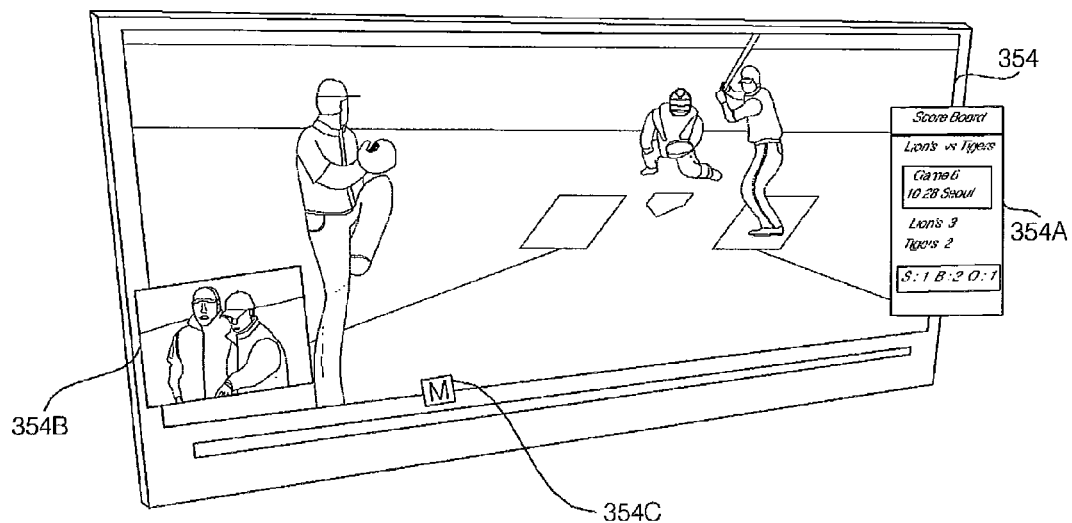

FIGS. 7A through 7C illustrate various images that can be displayed by the image display apparatus 100. Referring to FIGS. 7A through 7C, the image display apparatus 100 may display a 3D image in one of the formats shown in FIGS. 5(a) through 5(e), e.g., the top-down format.

More specifically, referring to FIG. 7A, when the play of video data is terminated, the image display apparatus 100 may display two perspective images 351 and 352 in the top-down format so that the two perspective images 351 and 352 can be arranged side by side vertically on the display unit 180.

The image display apparatus 100 may display a 3D image on the display unit 180 using a method that requires the use of polarized glasses to properly view the 3D image. In this case, when viewed without polarized glasses, the 3D image and 3D objects in the 3D image may not appear in focus, as indicated by reference numerals 353 and 353A through 353C.

On the other hand, when viewed with polarized glasses, not only the 3D image but also the 3D objects in the 3D image may appear in focus, as indicated by reference numerals 354 and 354A through 354C. The 3D objects in the 3D image may be displayed so as to appear to protrude beyond the 3D image.

If the image display apparatus 100 displays a 3D image using a method that does not require the use of polarized glasses to properly view the 3D image, the 3D image and 3D objects in the 3D image may all appear in focus even when viewed without polarized glasses, as shown in FIG. 7C.

The term 'object,' as used herein, includes various information regarding the image display apparatus 100 such as audio output level information, channel information, or current time information and an image or text displayed by the image display apparatus 100.

For example, a volume control button, a channel button, a control menu, an icon, a navigation tab, a scroll bar, a progressive bar, a text box and a window that can be displayed on the display unit 180 of the image display apparatus 100 may be classified as objects.

A user may acquire information regarding the image display apparatus 100 or information regarding an image displayed by the image display apparatus 100 from various objects displayed by the image display apparatus 100. In addition, a user may input various commands to the image display apparatus 100 through various objects displayed by the image display apparatus 100.

When a 3D object has as positive depth level, it may be displayed so as to appear to protrude toward a user beyond the display unit 180. The depth on the display unit 180 or the depth of a 2D image or a 3D image displayed on the display unit 180 may be set to 0. When a 3D object has a negative depth level, it may be displayed so as to appear to be recessed into the display unit 180. As a result, the greater the depth of a 3D object is, the more the 3D object appears to protrude toward a user.

The term '3D object,' as used herein, includes various objects generated through, for example, a scaling operation, which has already been described above with reference to FIGS. 6(a) through 6(c), so as to create a sense of three-dimensionality or the illusion of depth.

FIG. 7C illustrates a PIP image as an example of a 3D object, but the present invention is not restricted to this. That is, electronic program guide (EPG) data, various menus provided by the image display apparatus 100, widgets or icons may also be classified as 3D objects.

Figure 8:
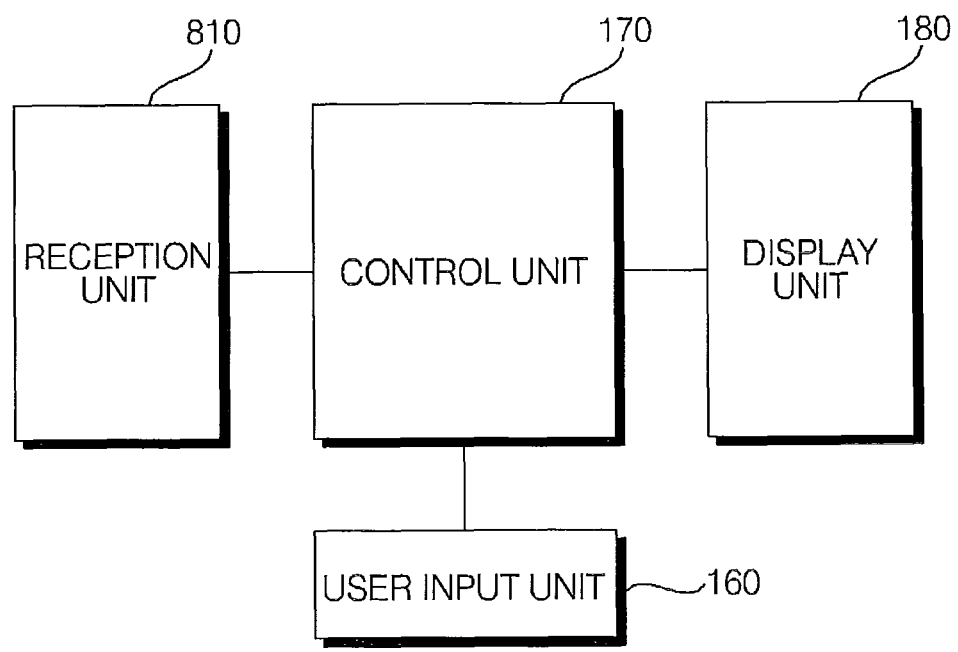
FIG. 8 illustrates a block diagram of an image display apparatus according to another exemplary embodiment of the present invention.

FIG. 8 illustrates a block diagram of an image display apparatus according to an exemplary embodiment of the present invention. Referring to FIG. 8, the image display apparatus may include a reception unit 810, a user input unit 160, a control unit 170 and a display unit 180. The image display apparatus may also include a storage unit (not shown) and an audio output unit (not shown). The exemplary embodiment of FIG. 8 is similar to the exemplary embodiment of FIG. 1, and thus will hereinafter be described, focusing mainly on differences with the exemplary embodiment of FIG. 1.

Referring to FIG. 8, the reception unit 810 may receive an image to be displayed on the display unit 180. More specifically, the reception unit 810 may be a function unit that can be connected either non-wirelessly or wirelessly to all possible paths through which image data to be displayed on the display unit 180 can be received.

The reception unit 810 may receive data either non-wirelessly or wirelessly. For example, the reception unit 810 may receive image data to be displayed on the display unit 180 from an external input device (such as a DVD player, a laptop computer, or a PMP) to which the image display apparatus is non-wirelessly connected via a cable. Alternatively, the reception unit 810 may receive image data to be displayed on the display unit 180 from an external input device to which the image display apparatus is wirelessly connected, via, for example, Bluetooth or IrDA. Still alternatively, the reception unit 810 may receive an RF signal from a wireless communication network via a modem or may receive a broadcast signal from a wireless communication network via an antenna. Then, the reception unit 810 may generate an image to be displayed on the display unit 180 based on the received RF or broadcast signal. When a user wishes to watch TV, make or receive a video call or surf on the Web with the use of the image display apparatus, the reception unit 810 may perform the functions of the external signal I/O unit 130 shown in FIG. 1. The reception unit 810 may also receive a TV broadcast. In this case, the reception unit 810 may perform the functions of the tuner unit 110.

The control unit 170 may generate an image signal corresponding to a first or second screen, and may transmit the image signal to the display unit 180. At least one of the first and second screens may be a stereoscopic screen, which is a screen with an illusion of depth or slope and includes one or more 3D objects.

The depth of an image may create an illusion of distance between the image and the user. An image with depth may be displayed so as to appear to protrude beyond the display unit 180 or to be recessed into the display unit 180. A two-dimensional (2D) image displayed on the display unit 180 as a main screen may have a depth of 0, a 2D image displayed so as to appear to protrude beyond the main screen may have a positive depth value, and a 2D image displayed so as to appear to be recessed into the main screen may have a negative depth value. That is, the greater the depth of an image, the more the image appears to protrude toward a user. The depth of an image may be adjusted by a formatter.

The expression 'slope of a screen,' as used herein, may indicate the degree to which a screen appears to be tilted in a certain direction due to a stereoscopic effect. The greater the slope of a screen, the more the screen appears to be tilted forwards, backwards, or sideways. For example, if a rectangular screen appears to be trapezoidal or parallelogrammic in shape and to protrude beyond the display unit 180, the screen may be determined to be a screen to which a stereoscopic effect has been applied so as to have slope. The greater the slope of an image, which is originally rectangular in shape, the more the image appears to be trapezoidal or parallelogrammic in shape, and the greater the difference between the lengths of the bases of the trapezoidal image or the difference between the two adjacent interior angles of the parallelogrammic image.

The control unit 170 may generate the first or second screen or the image signal corresponding to the first or second screen based on an image received by the reception unit 810s or an image present in the image display apparatus.

The image display apparatus may display the first and second screens at the same time. The first and second screens may be displayed on the display unit 180 at the same time. The first and second screens may be displayed independently as separate screens. A content item displayed on the second screen may or may not be associated with a content item displayed on the first screen. The first and second screens may be turned on or off individually. That is, the second screen may not necessarily be affected by the first screen. The first screen may be a 2D or 3D screen.

The control unit 170 may generate an image signal corresponding to the second screen based on a data signal received from an external source or information extracted from the received data signal, and may process the image signal by reflecting depth information and slope information. More specifically, the control unit 170 may process the image signal corresponding to the second screen by, for example, determining the shape (e.g., a rectangular, a parallelogrammic or a trapezoidal shape) in which the second screen should be displayed and adjusting the disparity between a left-eye image and a right-eye image. Thereafter, the control unit 170 may provide the processed image signal to the display unit 180. Then, the display unit 180 may display the second screen based on the processed image signal provided by the control unit 170.

The second screen may have a different depth or slope from the first screen. That is, the second screen may appear to be located closer than the first screen to or further than the first screen from a user. The second screen may be displayed so as to appear to protrude toward a user beyond the display unit 180. That is, a stereoscopic image or a 3D image may be displayed on the second screen. The control unit 170 may perform image signal processing such that the first and second screens can have different depths from a user. If more than one second screen is displayed along with the first screen, the control unit 170 may perform image signal processing such that the second screens can be different distances apart from a user. If there is more than one second screen provided, the control unit 170 may perform image signal processing such that a user can feel as if the second screens are different distances apart from the user.

In order to generate a stereoscopic image, the control unit 170 may include a subdivided module, for instance an image processor (not shown). The image processor may generate a 3D image corresponding to the second screen, and may process the image signal of the 3D image by varying the disparity or distance between a left-eye image and a right-eye image of the 3D image or applying control information to the 3D image. As a result, the second screen can be displayed so as to have a different depth from the first screen. That is, the control unit 170 may control the distance or angle of the 3D image corresponding to the second screen in accordance with a user's line of sight such that the second screen can be tilted or rotated toward the user, if necessary. The control unit 170 may also control the direction in which, and the degree to which the second screen is tilted or rotated.

The position and the depth of the second screen may be determined in consideration of the state of a user or in accordance of a command issued by the user. For this, the image display apparatus may also include the user input unit 160. The user input unit 160 may include an interface (not shown) and/or various sensors (not shown). In order to vary the position of display of the second screen in accordance with the location of a user, the user input unit 160 may determine the location of the user with the use of a position sensor, and may provide the results of the determination to the control unit 170. Then, the control unit 170 may perform image signal processing such that the greater the distance between the user and the image display apparatus, the more the second screen appears to protrude toward the user beyond the display unit 180.

The second screen may be turned on or off or may be changed in response to a signal input by a user or a gesture made by a user. For this, the user input unit 160 may detect a signal, if any, input by a user or a gesture, if any, made by a user, may generate a command signal based on the result of the detection, and transmit the command signal to the control unit 170. More specifically, the user input unit 160 may perform the functions of the interface unit 150 shown in FIG. 1. In addition, the user input unit 160 may sense the location of a user, the voice of the user or a gesture made by the user using various sensors and may transmit the result of the sensing to the control unit 170. Alternatively, the user input unit 160 may generate a command signal corresponding to the result of the sensing and may transmit the command signal to the control unit 170.

The user input unit 160 may include one or more sensors for sensing a gesture made by a user or a change in the user's line of sight or for determining the location or the posture of the user. For example, if a gesture made by the user is detected at a location corresponding to the second screen, the control unit 170 may turn on or off the second screen or may replace an image currently being displayed on the second screen with another image. More specifically, the user input unit 160 may sense a gesture made by the user or a change in the location of the user, and the control unit 170 may generate a control signal based on the results of the sensing performed by the user input unit 160. For example, if a gesture made by the user is detected when a TV broadcast is being displayed on the second screen, the detected gesture may be interpreted as corresponding to a signal for switching TV channels or for turning on or off the second screen. On the other hand, if a gesture made by the user is detected when a file present in the storage unit is open, the detected gesture may be interpreted as corresponding to a signal for selecting another file.

The user input unit 160 may recognize the voice of a user or various sounds generated by the user with the aid of an acoustic sensor, and may provide the results of the recognition to the control unit 170 as a user signal. The conversion of various sensing data such as motion data, position data, or audio data acquired by the user input unit 160 into a signal that is recognizable to the control unit 170 is obvious to one of ordinary skill in the art to which the present invention pertains, and thus, a detailed description thereof will be omitted.

The control unit 170 may adjust the size, slope and position of the second screen in accordance with a command signal input thereto via the user input unit 160 or a gesture or the voice of a user sensed by the user input unit 160. For example, if the user points at either end of the second screen with two fingers or both hands and then moves them apart, the controller 170 may determine that a command to enlarge the second screen has been issued, and may thus enlarge the second screen. Alternatively, if the user points at the second screen with one hand and then rotates or moves the hand, the control unit 170 may change the slope or position of the second screen accordingly.

In order to control the slope or depth of the second screen, the recognition of a reference point may be required. The reference point may be a user, a part of the body of the user or a detectible object attached onto the body of the user. For example, the face or the eyes of the user may be used as the reference point. In this case, the position and slope of the second screen may be determined in accordance with the reference point such as the positions of the user's eyes or the user's eye level. Since the user's eye level varies in accordance with the posture of the user, it is possible to control the slope of the second screen in accordance with the shape of the body of the user and the posture of the user.

In order to sense the reference point, a shape recognition sensor or a position sensor may be used.

For example, if the user's eye level is detected to be low due to his or her height or posture, the reference point may be determined to be low in position, and thus, the second screen may be displayed at a position near the ground. In this case, the second screen may be slightly tilted or rotated toward the user. As a result, the angle between the user's line of sight and the normal line to the second screen may decrease, and thus, the user can view the second screen properly.

If the reference point is located on one side of the image display apparatus, the second screen may be tilted or rotated so as to properly face the user. That is, the second screen may be tilted or rotated in such a direction that the angle between the user's line of sight and the normal line to the second screen can decrease. The second screen may be displayed as a trapezoid or a parallelogram in order to appear as if tilted or rotated. The control unit 170 may determine the shape in which the second screen is to be displayed. Thereafter, if the second screen is determined to be displayed as a trapezoid or parallelogram, the control unit 170 may determine the degree to which the second screen appears to be tilted or rotated by adjusting the difference between the lengths of the bases of the trapezoid or the difference between the two adjacent interior angles of the parallelogram. In short, the control unit 170 may determine not only the distance, slope and tilt angle of the first screen but also the distance, slope and tilt angle of the second screen.

If the second screen is tilted or rotated, the first screen may be tilted or rotated accordingly. Due to the spatial restriction of the display unit 180, the first and second screens may not be displayed properly together on the display unit 180. For this, the first screen may be slightly tilted or rotated when displayed along with the second screen. In this manner, it is possible for a user to properly view both the first and second screens without the second screen being interfered with by the first screen. In addition, it is possible to display more than one content item at the same time through the first and second screens. Alternatively, the second screen may be slightly tilted or rotated when displayed along with the first screen. In this manner, it is possible to provide a user with various additional information regarding the first screen through the second screen without interfering the user's viewing of the first screen.

For example, the second screen may be set as a default to be displayed to be tilted on one side of the first screen. In this case, the control unit 170 may determine the tilt direction, the slope or the rotation angle of the second screen in accordance with a command input thereto by a user or in consideration of the posture, the location and the state of movement of the user.

As described above, an image displayed on the second screen may be associated with an image displayed on the first screen. Given that additional information regarding a content item displayed on the first screen can be displayed on the second screen, information or an image displayed on the second screen will hereinafter be referred to as additional information or an additional image. For example, when a broadcast of a sports event is displayed on the first screen, additional information such as general information regarding the sports event and information regarding the players may be displayed on the second screen. The additional information may be included in a data signal received by the image display apparatus as OSD data.

An additional image associated with or received along with an image displayed on the first screen may be displayed on the second screen. For example, if a plurality of viewpoint images of a sports event captured by different cameras are received, one of the plurality of viewpoint images may be selected as a main image and may thus be displayed on the first screen, and the other non-selected images may be classified as additional images.

Alternatively, when a news screen is displayed on the first screen and thus a user is watching a news program from the first screen, various images may be displayed in connection with the news screen as second screens. In this case, the various images may be classified as additional images.

In this manner, the first and second screens may be displayed together on the display unit 180 of the image display apparatus.

An image that can be displayed on the first or second screen may be input to the image display apparatus through various paths and may then be stored in the image display apparatus. For example, the image display apparatus may display a movie received via a USB port on the first screen, and a call screen for making or receiving a video call on the second screen. Alternatively, the image display apparatus may display a plurality of internet windows and may allow a user to watch a TV broadcast therefrom while surfing on the internet through the plurality of internet windows. Still alternatively, the image display apparatus may display a plurality of broadcast signals at the same time on the display unit 180.

That is, the reception unit 810 may receive various images that can be displayed on the first or second screen from various sources (such as a broadcast channel, a wired or wireless communication system or an internal or external storage medium) via various paths. For example, the reception unit 810 may receive a plurality of image signals from different broadcast channels at the same time, or may receive one image signal from a predetermined broadcast channel and another image signal from a wired or wireless communication system at the same time.

The term 'broadcast channel,' as used herein, includes nearly all types of channels from which broadcast signals can be received such as a terrestrial, cable, internet, and satellite channels. The term 'wired or wireless communication system,' as used herein, includes nearly all types of communication systems, and examples of an image signal received from the wired or wireless communication system include an image signal associated with a video call, an image signal received from an IP network, and an image signal for displaying an internet window. The term 'storage medium,' as used herein, includes an internal storage medium included in the image display apparatus and an external storage medium connected to the image display apparatus.

In short, the image display apparatus may receive an image to be displayed on the first screen and an image to be displayed on the second screen from different sources via different paths. If more than one second screen is provided, the image display apparatus may receive an image to be displayed on one of the second screens and an image to be displayed on another second screen from different sources via different paths.

If an advertisement image is received during the display of a TV program on the first screen, the second screen may automatically pop up on the display unit 180, and the control unit 170 may display the advertisement image on the second screen. Alternatively, one or more second screens may be provided, and various TV programs other than the TV program currently being displayed on the first screen may be displayed on the second screens. If the advertisement image is displayed on the first screen, a predefined image selected in response to a user input, for example, a TV broadcast received from a previously-stored channel or an image stored in the image display apparatus or an external storage medium connected to the image display apparatus may be displayed on the second screen. For this, the image display apparatus may permanently or temporarily store a number of channels preferred or recently viewed by a user. Then, whenever an advertisement image is received, the image display apparatus may receive an image signal from one of the stored channels, and may display the received image on the second screen.

Alternatively, if an advertisement image is received through the reception unit 810 as an image to be displayed on the first screen, the control unit 170 may display an image currently being displayed on the second screen on the first screen, and may display the advertisement image on the second screen. In this case, if there is more than one second screen provided, one of the images currently being displayed on the second screens may be selected by default or user setting, and the selected image may be displayed on the first screen.

Figure 9:
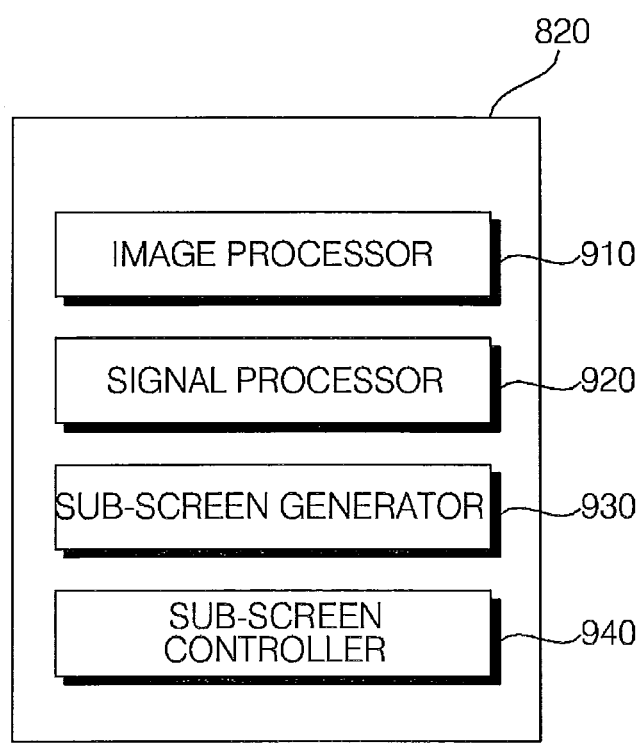
FIG. 9 illustrates a block diagram of a control unit of an image display apparatus according to another exemplary embodiment of the present invention.

FIG. 9 illustrates a block diagram of a control unit 820 of an image display apparatus according to another exemplary embodiment of the present invention. Referring to FIG. 9, the control unit 820 may include an image processor 8910, a signal processor 920, a sub-screen generator 930 and a sub-screen controller 940. In this exemplary embodiment, the image display apparatus may display a plurality of screens at the same time, and each of the screens may be classified as a main screen (or a first screen) or a sub-screen (or a second screen).

The image processor 910 may read data received by the image display apparatus or data present in a storage unit of the image display apparatus, and may generate an image signal to be displayed as a 2D image or a 3D image based on the read data. The sub-screen generator 930 may create one or more sub-screens based on the image signal generated by the image processor 910, and may output the sub-screens to a display unit of the image display apparatus. Control information specifying how a sub-screen should be displayed (such as the direction in which, and the angle at which the sub-screen should be tilted or rotated and the depth at which the sub-screen should be displayed) may be reflected into a corresponding sub-screen image signal. Alternatively, the sub-screen generator 930 may generate a sub-screen image signal and control information regarding the sub-screen image signal separately, and may provide both the sub-screen image signal and the control information to the display unit. In this case, the display unit may process the sub-screen image signal in accordance with the control information, and may display a sub-screen whose depth or slope is determined based on the results of the processing.

If a gesture made by a user or a command (such as a command to turn on or off a sub-screen, change the size of a sub-screen or switch channels) input to the image display apparatus by the user is detected when a sub-screen is displayed on the display unit, the signal processor 920 may analyze the detected gesture or command, may generate a control signal based on the results of the analysis, and may output the control signal to the sub-screen controller 940 or the sub-screen generator 930. The sub-screen controller 940 may control the sub-screen currently being displayed on the display unit in accordance with the control signal. The sub-screen generator 930 may reprocess an image signal corresponding to the sub-screen currently being displayed on the display unit in accordance with the control signal.

Figure 10:
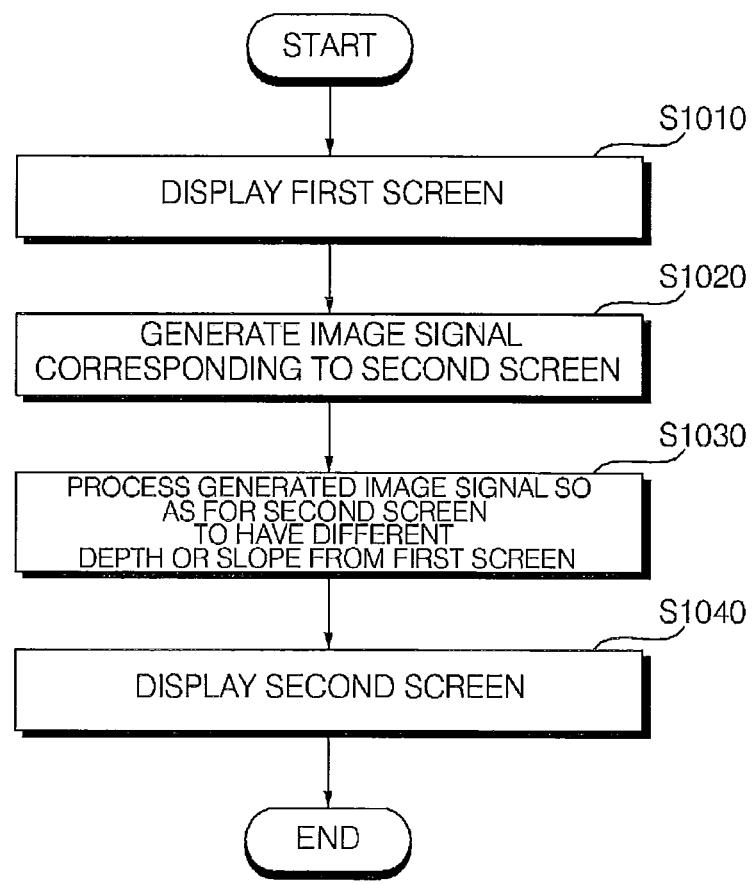
FIG. 10 illustrates a flowchart of an image display method according to an exemplary embodiment of the present invention.

FIG. 10 illustrates a flowchart of an image display method according to an exemplary embodiment of the present invention. Referring to FIG. 10, an image display apparatus may display a first screen (1010). The generation of the first screen is obvious to one of ordinary skill in the art to which the present invention pertains, and thus, a detailed description thereof will be omitted. Thereafter, the image display apparatus may generate an image signal corresponding to a second screen (1020). The second screen may be a 3D screen or a 2D screen including one or more 3D objects, which are objects that can be displayed three-dimensionally in the space between the image display apparatus and a user so as to create the illusion of depth and distance. Likewise, the first screen may be a 3D screen or a 2D screen including a number of 3D objects.

The image signal corresponding to the second screen may be a 2D image signal or a 3D image signal that can be readily displayed as a 3D image. If the image signal corresponding to the second screen is a 2D image signal, the image signal corresponding to the second screen may be converted into a 3D image signal by a signal processing unit or a formatter of the image display apparatus. For this, a 3D image conversion engine or 3D image conversion software may be required. The image signal corresponding to the second screen may be a still image signal or a moving image signal, or may be an image signal reconstructed from text data. More specifically, if text data is received, the image display apparatus (particularly, the signal processing unit or a control unit of the image display apparatus) may reconstruct an image including text from the received text data, and may display the reconstructed image on the second screen. In short, the processing of various types of data so as to generate an image signal that can be displayed three-dimensionally on a 2D screen falls within the scope of the present invention.

The image signal corresponding to the second screen may include control information regarding the state of display of the second screen. Alternatively, the control information may be generated and provided separately from the image signal corresponding to the second screen. The control information may specify the facing direction, slope, size and depth of the second screen and the distance between the second screen and a user. The control information will be described later in further with reference to FIG. 11.

Thereafter, the image display apparatus may process the image signal corresponding to the second screen in accordance with the control information, and may display the processed image signal such that the second screen can have a different depth from the first screen or can be tilted or rotated toward the user (1030).

Thereafter, the image display apparatus may display the second screen based on the image signal processed in operation 1030. The three-dimensionality of the second screen may be determined by the control information. The second screen may appear to protrude beyond the first screen or to be recessed into the first screen. That is, the second screen may appear to be closer or further than the first screen to or from a user.

The first and second screens may be displayed so as to face different directions. The second screen may be tilted or rotated and may thus face a different direction from that of the first screen. As described above with reference to FIG. 8, the second screen may be displayed on one side of the first screen and may be tilted or rotated toward a user so as not to interfere with a user's viewing of the first screen. In this case, the user can properly view both the first and second screens with ease.

Figure 11:
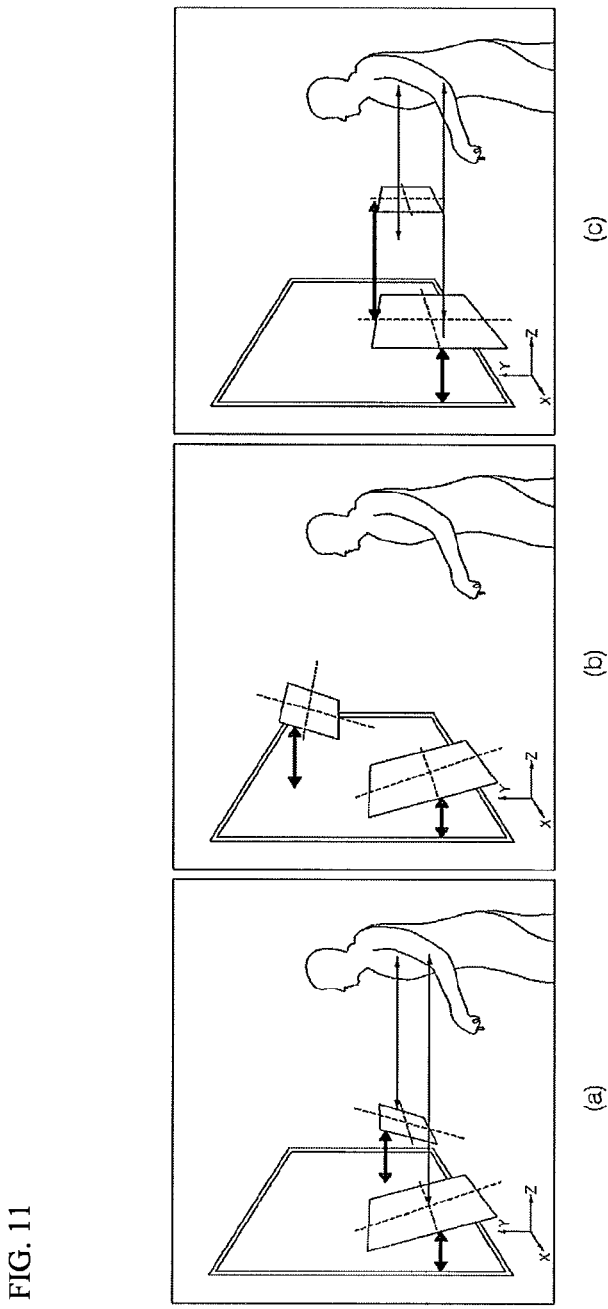
FIG. 11 illustrates how to change of the state of display of a second screen in accordance with control information.

FIG. 11 illustrates how to change of the state of display of a second screen in accordance with control information. Referring to FIG. 11, it is assumed that a horizontal axis of a normal plane to a user's line of sight (i.e., the plane including the surface of a display unit of an image display apparatus) is an x axis, a vertical direction of the normal plane to the user's line of sight is a y axis, and a normal line to the surface of the display unit of the image display apparatus represents a z axis. The relative position of a second screen to a first screen can be represented using the x- and y-axes, and the distance between a second screen and the user can be represented using the z axis.

Referring to FIG. 11(*a*), a second screen may be tilted or rotated about the x axis. A user's eye level may vary in accordance with his or her posture or height. If a user's eye level is determined to be relatively high, a second screen may be slightly rotated counterclockwise about the x axis so as to facilitate the viewing of the second screen by the user. On the other hand, if the user's eye level is determined to be relatively low, the second screen may be slightly rotated clockwise about the x axis so as to facilitate the viewing of the second screen by the user.

In order to control the rotation angle or slope of the second screen, the user may directly inputting a control signal to the image display apparatus using an additional device such as a remote control device or may making a gesture or a sound. Then, a control unit of the image display apparatus may detect the control signal input by the user or the gesture or sound made by the user with the aid of a sensor of the image display apparatus, and may control the rotation angle or slope of the second screen in accordance with the results of the detection.

FIG. 11(*b*) illustrates how to control the position of a second screen on the x-y plane. Referring to FIG. 11(*b*), the position of a second screen may be variable, rather than fixed. The position of a second screen may change in accordance with the rotation or tilt of the second screen. The position of a second screen may be controlled in accordance with a signal input by a user or a gesture or sound made by the user. Alternatively, the location of a user may be determined using a sensor of the image display apparatus, and the position of a second screen may be determined based on the result of the determination.

For example, if a user puts his or her hand over a second screen for more than a predefined amount of time, the image display apparatus may determine the position of the user's hand and may determine that a command to change the position of the second screen has been issued. On the other hand, if the user makes a gesture for dragging and dropping the second screen, the image display apparatus may detect the gesture made by the user and may then move the second screen in accordance with the results of the detection.

FIG. 11(*c*) illustrates how to control the position of a second screen on the z axis, i.e., the depth of the second screen. Referring to FIG. 11(*c*), two second screens having different z coordinate values may appear to have different distances from a user or different depths. The two second screens may both appear to protrude toward the user beyond a first screen. That is, the two second screens may have greater depths than the first screen. The degree to which each of the two second screens appears to protrude beyond or to be recessed into the first screen or the distance of each of the two second screens from the user may be determined by the position of the corresponding second screen on the z axis.

The position of a second screen on the z axis may be determined in various manners For example, the position of a second screen may be determined by the location of a user. Alternatively, the position of a second screen may be determined by the importance of information or an image displayed on the second screen. For example, a second screen may appear to be closer to a user when displaying important information (such as information requested by the user) than when displaying less important information (such as settings data). Still alternatively, the position of a second screen on the z axis may be determined by the date of creation of the second screen, the date of request of the second screen or the importance of the second screen. In this case, if there is the need to display more than one second screen at the same time, the second screens may be aligned along the z axis in order of the date of creation of the second screen, the date of request of the second screen or the importance of the second screen.

If there are two or more users each requesting a second screen, the positions of the second screens may be determined by their respective users. The position of a second screen on the z axis may be controlled in accordance with a user command or a gesture or sound made by a user.

At least two of the rotation or tilting of a second screen, the change of the position of the second screen on the x-y plane and the change of the position of the second screen on the z axis may be performed at the same time, but independently.

Figure 12:
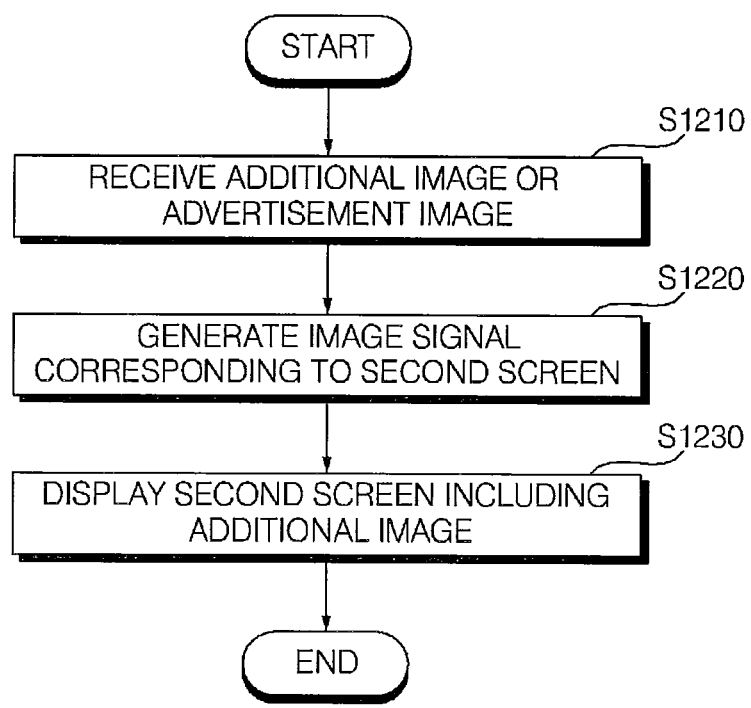
FIG. 12 illustrates a flowchart of an image display method according to another exemplary embodiment of the present invention.

FIG. 12 illustrates a flowchart of an image display method according to another exemplary embodiment of the present invention. Referring to FIG. 12, an image display apparatus may receive an additional image, additional information or an advertisement image (1210). The additional information may be information regarding an image currently being displayed on a first screen, and the additional image may be an image received along with the image currently being displayed on the first screen. If a broadcast of a sports event is displayed on the first screen, information regarding the players may be classified as the additional information, and a broadcast image received along with a main broadcast image currently being displayed on the first screen, but currently not being displayed on the first screen, may be classified as the additional image. Examples of the advertisement image include a public service announcement and a commercial advertisement. The advertisement image may be supposed to be displayed on the first screen. The additional image or information and the advertisement image may be received via different paths.

Thereafter, the image display apparatus may generate a second screen regardless of whether there is a request for the generation of the second screen (1220). More specifically, if the additional image or information is received in operation 1210, the image display apparatus may generate a second screen for providing the additional image or information. On the other hand, if the advertisement image is received in operation 1210, the image display apparatus may generate a second screen for providing an image other than the advertisement image during the display of the advertisement image on the first screen. Thereafter, the image display apparatus may display the second screen generated in operation 1220 (1230).

When the advertisement image begins to be displayed on the first screen, the image display apparatus may display a broadcast program received from a different channel from that of the advertisement image or an image previously stored therein on the second screen. Alternatively, when the advertisement image begins to be displayed on the first screen, the image display apparatus may temporarily switch an image currently being displayed on the second screen and the advertisement image. If the image currently being displayed on the second screen is an advertisement, a default image or an image selected by a user may be displayed on the first or second screen instead of the advertisement image. More specifically, it may be determined what image is to be displayed instead of the advertisement image in real time in response to a signal input by the user. Alternatively, a predetermined image may be set as a default in advance to be displayed instead of the advertisement image. For example, a channel registered as a preferred channel by the user, a channel frequently selected by the user, and a channel most recently selected by the user may be permanently or temporarily stored in the image display apparatus. Then, when the advertisement image is received, one of the channels stored in the image display apparatus may be selected, and an image received from the selected channel may be displayed on the first or second screen instead of the advertisement image. An image present in a storage unit of the image display apparatus or an image present in an external storage medium connected to the image display apparatus may be displayed on the first or second screen instead of the advertisement image.

Figure 13:
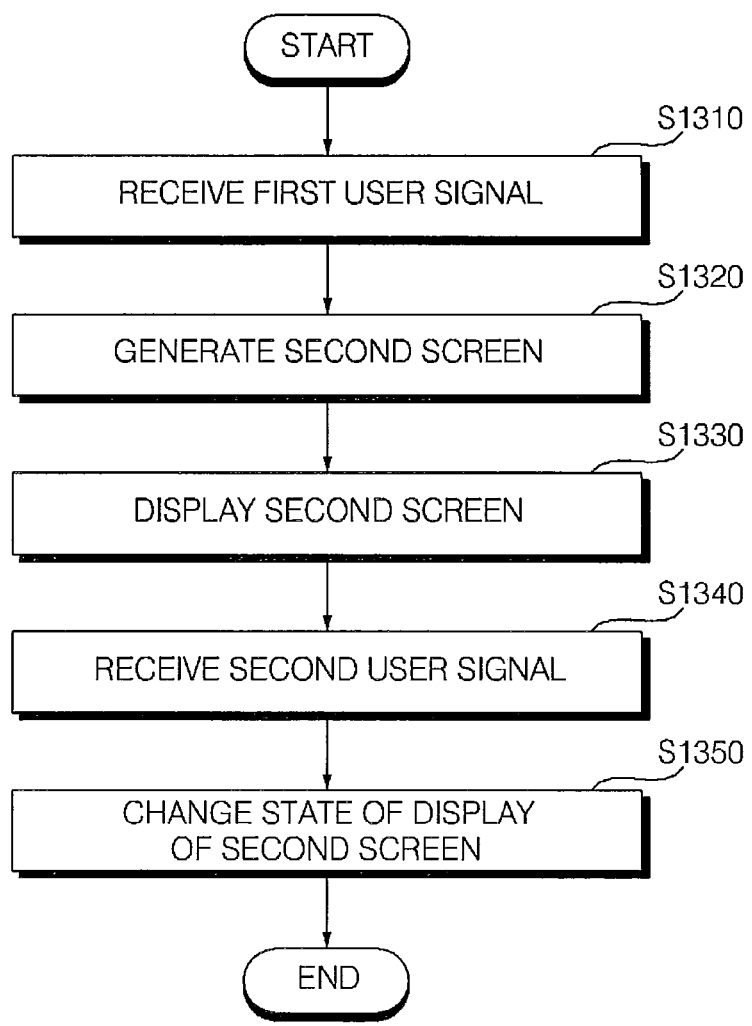
FIG. 13 illustrates a flowchart of an image display method according to another exemplary embodiment of the present invention.

FIG. 13 illustrates a flowchart of an image display apparatus according to another exemplary embodiment of the present invention. Referring to FIG. 13, an image display apparatus may receive a first user signal for requesting a second screen from a user (1310). More specifically, the user may issue a request for a second screen to the image display apparatus by using a remote control device or a button on the image display apparatus. Then, a control unit of the image display apparatus may receive the request issued by the user via an interface unit of the image display apparatus, and may analyze the received request.

Alternatively, the user may issue a request for a second screen to the image display apparatus by making a predefined gesture or sound. In this case, the image display apparatus may sense and analyze the gesture or sound made by the user and may identify that a request for a second screen has been received from the user based on the results of the analysis. Still alternatively, if an advertisement image to be displayed on a first screen is received, the image display apparatus may determine that a request for a second screen has been issued.

Thereafter, the image display apparatus may generate a second screen in response to the first user signal (1320). The second screen may be a 3D screen or a 2D screen including a number of 3D objects. The second screen may have a different depth from the first screen and may thus appear to protrude beyond or be recessed into the first screen. Control information specifying, for example, the position, slope and/or rotation angle of the second screen may be included in an image signal corresponding to the second screen. The image signal corresponding to the second screen may be a 3D image signal received from a broadcasting station or a server or may be a 3D image signal reconstructed from a 2D image signal.

Thereafter, the image display apparatus may display the second screen (1330). The state of display of the second screen may be determined by default or user setting.

Thereafter, the image display apparatus may receive a second user signal for changing the state of display of the second screen (1340). The second user signal may include the user's request regarding how to change the state of display of the second screen.

For example, if a movie is being played on the first screen, the user may input the first user signal and may thus allow additional information regarding the movie such as the profiles of the characters featured in the movie and information regarding the director of the movie to be displayed on the second screen. Alternatively, the user may open an internet search window on the second screen and may search for information regarding the movie through the internet search window.

The second user signal may serve as a control signal for changing the state of display of the second screen. Thus, the image display apparatus may change the state of display of the second screen in response to the second user signal. For example, the image display apparatus may change the position of the second screen on an x-y plane or on a z axis and/or the size of the second screen in response to the second user signal.

In operation 1340, the user may also input a user signal for zooming in or zooming out the second screen or a user signal for controlling the slope or rotation angle of the second screen in accordance with his or her location or posture to the image display apparatus in operation 1340.

The image display apparatus may detect a gesture, posture or sound made by the user with the use of a sensor, and may thus recognize the result of the detection as a user signal. The sensing of the state of the user and the generation of a control signal based on the results of the sensing have already been described in detail in the previous exemplary embodiments, and thus, detailed descriptions thereof will be omitted.

Thereafter, the image display apparatus may change the state of display of the second screen in accordance with the second user signal (1350). For example, if the second user signal corresponds to a request to switching to a new channel, the image display apparatus may display an image received from a channel desired by the user on the second screen or may provide another second screen for displaying the image received from the channel desired by the user. Alternatively, if the second user signal corresponds to a request to rotate or move the second screen, the image display apparatus may generate control information for rotating or moving the second screen or may modify an image signal corresponding to the second screen so as to rotate or move the second screen.

Figure 14A:
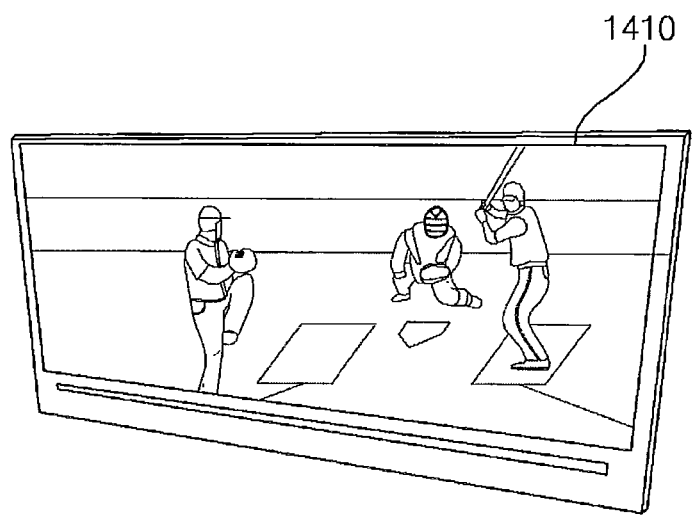
FIGS. 14A through 14C illustrate various examples of how to display first and second screens.
Figure 14B:
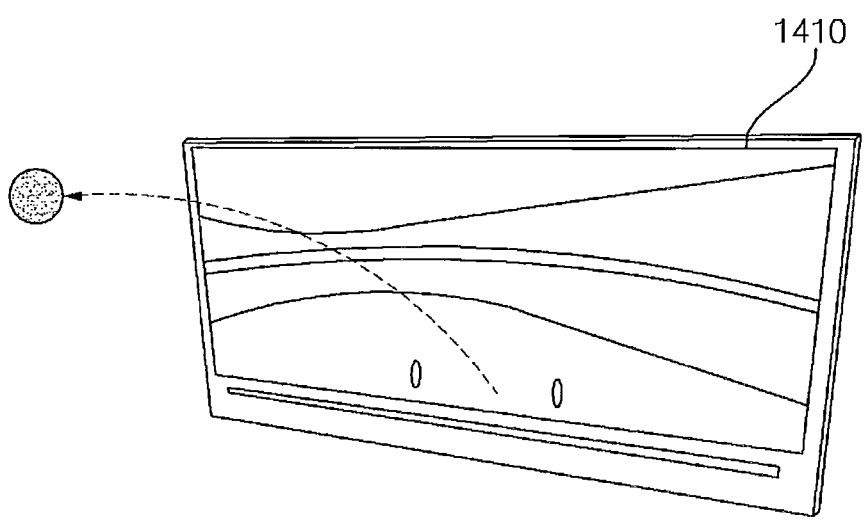
Figure 14C:
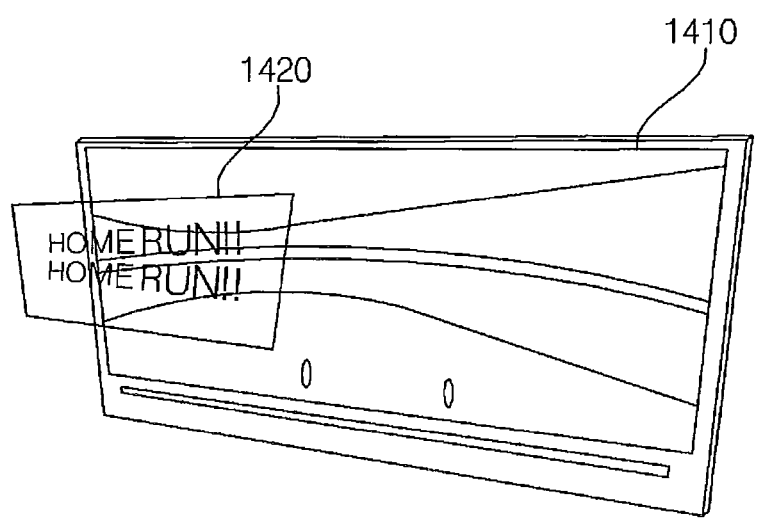

FIGS. 14A through 14C illustrate various examples of how to display first and second screens. Referring to FIG. 14A, a broadcast of a baseball game may be displayed on a first screen 1410 as a 3D or stereoscopic image. Then, when a batter hits a home run, a ball hit by the batter may be displayed so as to appear as if flying out of the first screen 1410 toward a user. Then, a second screen 1420 indicating that the batter has hit a home run may be displayed over the first screen 1410.

Additional information regarding the baseball game such as information regarding the batter and the score of each team may be provided by the second screen 1420. Alternatively, when an image of the batter hitting a home run is displayed on the first screen 1410, various additional images such as those of other players, coaching staff and the audience in the ballpark may be displayed on the second screen 1420.

The image display apparatus according to the present invention and the image display method of the image display apparatus according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, and an optical data storage. The computer-readable recording medium can be distributed over a plurality of computer systems connected to a network so that computer-readable code is written thereto and executed therefrom in a decentralized manner Functional programs, code, and code segments needed for realizing the present invention can be easily construed by one of ordinary skill in the art.

As described above, according to the present invention, it is possible to provide a user with a variety of information using stereoscopic images. In addition, it is possible to provide a user with an image and additional information regarding the image at the same time. Moreover, when various multimedia content items are provided at the same time using multiple screens, it is possible to appropriately determine the positions and angles of the multiple screens and thus to allow a user to view each of the multimedia content items properly without the multiple screens interfering with one another. Furthermore, it is possible to provide a stereoscopic image suited to a user's environment by configuring the stereoscopic image in consideration of the location and posture of the user.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image display method of an image display apparatus, the image display method comprising:
    displaying a 3D object on a display;
    detecting, by the image display apparatus, a user's eye level relative to the image display apparatus; and
    changing a characteristic of the displayed 3D object based on the detected user's eye level so that the 3D object is tilted relative to a surface of a screen of the image display apparatus based on the detected user's eye level, the characteristic including a size, a shape and a slope of the displayed 3D object,
    wherein, when the user's eye level is detected to be low relative to the image display apparatus, the 3D object is tilted so that an angle between the user's line of sight and the display is decreased.

2. The method of claim 1, wherein the changing the slope includes setting a parallax parameter of the 3D object.

3. The method of claim 1, wherein the 3D object includes two 3D objects, and
    wherein the changing the slope includes independently changing the slope of each of the two 3D objects based on the detected user's eye level.

4. The method of claim 1, further comprising:
    detecting a change of the user's eye level; and
    changing one of the distance of the 3D object from the screen and the slope based on the detected user's eye level change.

5. The method of claim 1, further comprising:
    detecting a user motion relative to the screen; and
    changing the slope in response to the detected user motion.

6. The method of claim 1, further comprising:
    changing at least one of a position, the size, or a depth of the 3D object based on a signal input by the user or a gesture or sound made by the user.

7. The method of claim 1, wherein the 3D object is a 3D picture-in-picture display.

8. The method of claim 1, further comprising:
if there are two or more users each requesting the 3D object, changing a position of the 3D object in consideration of user's eye levels of the two or more users.

9. The method of claim 1, wherein the 3D objet has a planar surface, and
wherein the slope corresponds to a line on the planar surface.

10. The method of claim 1, wherein the characteristic further includes a location of the 3D object relative to a center point of the screen.

11. An image display apparatus, comprising:
a detector configured to detect a user's eye level relative to the image display apparatus;
a display having a screen and configured to display 2D or 3D images; and
a controller operatively connected to the detector and display, the controller configured to display a 3D object on the display; and
change a characteristic of the displayed 3D object based on the detected user's eye level so that the 3D object is tilted or rotated relative to a surface of a screen of the image display apparatus based on the detected user's eye level, the characteristic including a size, a shape and a slope of the displayed 3D object,
wherein, when the user's eye level is detected to be low relative to the image display apparatus, the 3D object is tilted so that an angle between the user's line of sight and the display is decreased.

12. The image display apparatus of claim 11, wherein the controller is configured to change the slope by changing a parallax parameter of the 3D object.

13. The image display apparatus of claim 11, wherein the 3D object includes two 3D objects, and
wherein the controller is configured to independently change the slope of each of the two 3D objects based on the detected user's eye level.

14. The image display apparatus of claim 11, wherein the controller is configured to
detect a change of the user's eye level, and
change one of a distance of the 3D object form the screen and the slope based on the detected user's eye level change.

15. The image display apparatus of claim 11, wherein the controller is configured to
detect a user motion relative to the screen, and
change the slope in response to the detected user motion.

16. The image display apparatus of claim 15, wherein the controller is configured to change at least one of a position, the size, or a depth of the 3D object based on a signal input by the user or a gesture or sound made by the user.

17. The image display apparatus of claim 15, wherein the 3D object is a 3D picture-in-picture display.

18. The image display apparatus of claim 15, wherein, if there are two or more users each requesting the 3D object, the controller is configured to change a position of the 3D object in consideration of user's eye levels of the two or more users.

19. The image display apparatus 11, wherein the 3D objet has a planar surface, and
wherein the slope corresponds to a line on the planar surface.

20. The image display apparatus 11, wherein the characteristic further includes a location of the 3D object relative to a center point of the screen.

* * * * *